(12) United States Patent
Matsumoto et al.

(10) Patent No.: US 6,826,347 B2
(45) Date of Patent: Nov. 30, 2004

(54) TWO-DIMENSIONAL OPTICAL ELEMENT ARRAY AND TWO-DIMENSIONAL WAVEGUIDE APPARATUS

(75) Inventors: Akira Matsumoto, Nagoya (JP); Masashi Fukuyama, Inuyama (JP); Akiyoshi Ide, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 79 days.

(21) Appl. No.: 10/190,904

(22) Filed: Jul. 8, 2002

(65) Prior Publication Data

US 2003/0012544 A1 Jan. 16, 2003

Related U.S. Application Data

(60) Provisional application No. 60/344,840, filed on Dec. 21, 2001, and provisional application No. 60/304,865, filed on Jul. 12, 2001.

(30) Foreign Application Priority Data

May 21, 2002 (JP) ........................................ 2002-145746

(51) Int. Cl.[7] .............................................. G02B 6/00
(52) U.S. Cl. ........................................ 385/137; 385/83
(58) Field of Search ............................. 385/49, 65, 83, 385/134–137

(56) References Cited

U.S. PATENT DOCUMENTS

| 4,046,454 A | 9/1977 | Pugh, III |
| 5,689,599 A | 11/1997 | Shahid |
| 2003/0174998 A1 * | 9/2003 | Shevchuk .................. 385/137 |

FOREIGN PATENT DOCUMENTS

| JP | 55-045051 | 3/1980 |
| JP | 56-113114 | 9/1981 |
| JP | 6-265736 | 9/1994 |

* cited by examiner

*Primary Examiner*—Phan T. H. Palmer
(74) *Attorney, Agent, or Firm*—Burr & Brown

(57) ABSTRACT

A two-dimensional optical element array with a high alignment precision of optical elements on a substrate and a high long-term reliability is provided. A two-dimensional optical fiber array includes a stacked plurality of optical fiber array units each having an optical fiber and a substrates, the substrate having one or more grooves each suited to a profile of the optical fiber on one of surfaces thereof, and one or more optical fibers being aligned and fixed in grooves, and is characterized in that optical fiber array units are stacked in a state such that surfaces of the substrates among adjacent two units out of the plurality of array units that face each other do not directly contact each other, and the adjacent two units do not have a direct mechanical influence on each other.

24 Claims, 19 Drawing Sheets

ENLARGED VIEW OF PORTION A

TWO-DIMENSIONAL OPTICAL ELEMENT ARRAY AND TWO-DIMENSIONAL WAVEGUIDE APPARATUS

This application claims the benefit of U.S. Provisional Application Ser. No. 60/304,865 filed Jul. 12, 2001, U.S. Provisional Application Ser. No. 60/344,840 filed Dec. 21, 2001, and Japanese Application 2002-145746, filed May 21, 2002, the entireties of which are incorporation herein by reference.

BACKGROUND OF THE INVENTION AND RELATED ART STATEMENT

The present invention relates to a two-dimensional optical element array and a two-dimensional waveguide apparatus. Specifically, this invention relates to a two-dimensional optical element array with a high alignment precision of optical elements (optical fiber, lens, for example) on a substrate and a high long-term reliability, and a two-dimensional waveguide apparatus having high density and capacity and allowing the number of steps in packaging or connection to be reduced.

Recently, with the increased communications data capacity, a demand for an optical cross-connect switch technique that provides a higher throughput of communications data has increased. For example, there has been used an optical switch that is manufactured using the MEMS (micro-electro-mechanical-system) for conducting fine machining in a semiconductor process including silicon etching, which is used for micro-machining and the like. Additionally, with the increased demand for reliability, as well as the demand for the higher throughput, a surface-emitting laser enabling communications with high definition and stability has come into common use.

In such an optical switch or surface-emitting laser, an optical element array is used (optical fiber array, lens array, waveguide (PLC) array, semiconductor laser (LD) array, photo diode (PD) array, for example). In the description hereinafter, the "optical fiber array" is taken as an example of the optical element array. In consideration of requirements for increased throughput and space-saving, the optical fiber array is a so-called two-dimensional optical fiber array (occasionally abbreviated as 2DFA hereinafter) whose cross-section taken along a plane perpendicular to central axes of the aligned optical fibers has a two-dimensional (hierarchical) configuration.

For example, as shown in FIG. 16, there has been proposed a conventional two-dimensional optical fiber array 100 with a pitch in a thickness direction determined by controlling a thickness of a substrate 102 with V-shaped grooves with high precision, arranging optical fibers 101 between the substrates 102 with V-shaped grooves and between the uppermost substrate 102 with V-shaped grooves and the fixing member 103, and stacking the substrates in such a manner that a front surface of each substrate 102 with V-shaped grooves is brought into contact with a back surface of the adjacent substrate 102 with V-shaped groove (for example, JP-A-56-113114).

A waveguide substrate (unit) 205 having one or more waveguides 201 patterned near a surface thereof, shown in FIG. 17, has been used in a splitter, AWG or waveguide modulator, for example. FIG. 17(a) is a schematic plan view of a splitter with one channel input and eight channel outputs, and FIG. 17(b) is a cross-sectional view taken along a line X—X in FIG. 17(a).

However, the conventional two-dimensional optical fiber arrays have problems as described below.

(1) It is difficult to control the thickness of a substrate having V-shaped grooves on a surface thereof (substrate with V-shaped grooves, simply referred to as a substrate occasionally hereinafter) with a precision of the order of submicrons, and the industrial limit of error for the entire surface of the substrate is approximately ±1 μm. For example, if eight substrates each having a thickness error of +1 μm are stacked, the resulting 2DFA has a thickness error of +7 μm at the maximum. Thus, the alignment precision of the optical fibers is inevitably low.

(2) Since the substrates abut on each other, the thickness of an adhesive layer therebetween is substantially 0. This is unfavorable for adhesion for most adhesives. In particular, if the substrates abut on each other over the substantially entire surface, the long-term reliability thereof is not always sufficiently assured.

(3) In the case where the upper substrate of adjacent two substrates serves as a fixing member for the lower substrate, including the case where it serves as a lid, it is inevitably required to adopt a method of "optical fiber array formation (FA formation) after stacking", in which the substrates are stacked and ferruled, and then the optical fibers are inserted, or a method of "FA formation simultaneous with stacking", in which the optical fibers are placed in the V-shaped grooves of the lowermost substrate before the second lowest substrate is positioned and placed on the lowermost substrate, the optical fibers are placed in the V-shaped grooves of the second lowest substrate before the third lowest substrate is positioned and placed on the second lowest substrate, and such a process is successively carried out. In the case of the former method of "FA formation after stacking," in order to assure precision, a hole, into which the optical fiber is to be inserted, has to be designed to minimize a clearance from the optical fiber. Thus, the hole is so small that it is extremely difficult to assemble the optical fibers without cutting. For example, in the case of the 2DFA comprising eight stacked substrates each having eight optical fibers aligned thereon, the number of optical fibers to be inserted is 64. Also in the case of the latter method of "FA formation simultaneous with stacking", the process is complicated and it is difficult to assemble the optical fibers without cutting. In addition, it is extremely difficult to simultaneously conduct positioning of the substrate and alignment of optical axes in each substrate including parallelization.

(4) In order to solve the above problem (3), there has been proposed an optical fiber array having, between the substrates with V-shaped grooves stacked one on another, an accommodation section for accommodating an optical fiber presser member (equivalent to the fixing member in this invention) in a state where the tops of the optical fibers protrude slightly from the V-shaped grooves and the optical fiber presser member on one substrate is kept from contact with the other substrate with V-shaped grooves (Japanese Patent No. 3108241). This optical fiber array is superior in that it has enhanced workability and alignment precision because a procedure of stacking after FA formation can be adopted. However, the above-described problems (1) and (2) associated with the alignment precision and the long-term reliability, respectively, has not been solved yet.

(5) As another approach for solving the above problem (3), there has been proposed an optical fiber multicore connector having a groove for an optical fiber and a rod for aligning axes of connector terminals (JP-A-55-45051). With the optical fiber multicore connector, although the procedure of FA formation simultaneous with stacking is involved, the workability is enhanced because the positioning is accomplished automatically by the action of the V-shaped grooves and the optical fibers. And, the above problem (2) of the long-term reliability can be solved depending on the setting of the depth of the groove. However, the above problem (1) of the alignment precision remains, and it is difficult to align the V-shaped grooves on both surfaces of a substrate with those on another substrate in the width direction. Thus, an additional problem of misalignment in the width direction has arisen.

(6) An optical communication network involving the two-dimensional optical fiber arrays described above has various connection points therein. The connection points each reflect light passing therethrough, and when the reflected light is launched again into its original fiber, a laser or the like is disadvantageously affected (a noise occurs, for example). In particular, in the case of the 2DFA mainly used for the MEMS switch or the like, since lens coupling is often adopted, and a space is provided immediately after the 2DFA, the reflected light, which is launched into the original fiber again, has a significant influence.

(7) To eliminate the disadvantage described above, in the past, reflection from an end face has been suppressed by providing an AR coating (which is formed by stacking an $SiO_2$ film and a $TiO_2$ film each having a thickness of $\frac{1}{4}\lambda$ and has a total thickness of the order of a wavelength of light ($\lambda$)) on the substrate and a light-emitting end face of the optical element, thereby enhancing reflection characteristics at the end faces. However, the AR coating film is easily degraded by effects of temperature, humidity and other environmental factors and adversely affects the reflection characteristics. Recently, in particular, with the development of the wavelength division multiplex (WDM) communication, the quantity of light transmitted through one optical fiber has been increased, and accordingly, the possibility of a local change in characteristics or local degradation due to the increased quantity of light (light with increased intensity) has been increased. Besides, since the AR coating is provided on the end face of the fiber array when the fibers are mounted thereon, it is difficult to use vacuum processing for vapor deposition of the AR coating. Thus, multiple AR coatings cannot be conducted at a time, and the cost is increased.

In addition, the above-described waveguide substrate has a problem as follows. When connecting the waveguide substrates and the optical fiber arrays with each other, each of the optical fiber arrays needs to be optically aligned with one of the waveguide substrates. In this alignment, the waveguide substrate and the optical fiber array are aligned with each other on the level of submicrons, and thus, the alignment inevitably requires extremely high precision and many process steps.

The present invention has been devised in view of the above-describe problems, and an object of this invention is to provide a two-dimensional optical element array with a high alignment precision of optical elements (optical fiber, lens, for example) on a substrate and a high long-term reliability, and a two-dimensional waveguide apparatus having high density and capacity and allowing the number of steps in packaging or connection to be reduced.

SUMMARY OF THE INVENTION

After earnest research, the inventor has found that the above problems can be solved by stacking a plurality of optical element array units, each of which is a set of a substrate and one or more optical elements aligned and fixed in the grooves thereof, in such a manner that surfaces of the substrates of adjacent optical element array units, which face to each other, are kept from direct contact with each other and from having a direct mechanical influence on each other (the same applies to a plurality of waveguide substrate units each having one or more waveguides patterned thereon in a planar manner). Thus, this invention has been completed.

Specifically, this invention provides a two-dimensional optical element array and a two-dimensional waveguide substrate apparatus as described below.

First there is provided a two-dimensional optical element array, which includes a stack of a plurality of optical element array units each having an optical element and a substrate, the substrate has one or more grooves, each suited to a profile of the optical element on one of surfaces thereof, and one or more optical elements being aligned and fixed in the grooves. The plurality of optical element array units are stacked in a state such that surfaces of the substrates among adjacent two units facing each other do not directly contact each other, and the adjacent two units do not have a direct mechanical influence on each other. Here, "the state the adjacent two units do not have a direct mechanical influence on each other" means "the state that a force, vibration or the like is not directly transmitted among the adjacent two units," and the same applies to the following description.

It is preferable that the optical element in the two-dimensional optical element array is an optical fiber or lens.

It is preferable that an apex of an optical element arranged on a substrate of a first optical element array unit is brought into contact with a surface of a substrate of a second optical element array unit, both of which face each other. Further, that the surfaces of the substrates of adjacent two optical element array units do not directly contact each other, and that the adjacent two units do not have a direct mechanical influence on each other in the two-dimensional optical element array.

It is preferred to stack the plurality of optical element array units in such a manner that an adhesive layer is interposed between an apex of an optical element arranged on the substrate of a first optical element array unit and a surface of a substrate of a second optical element array unit both of which face each other. Additionally, the apex of an optical element arranged on a substrate of a first optical element array unit is brought into contact with a surface of a substrate of a second optical element array unit. Both substrates of first and second units face each other, but the surfaces of the substrates of adjacent two optical element array units do not directly contact each other, and the adjacent two units do not have a direct mechanical influence on each other in the two-dimensional optical element array.

According to the present invention, there is also provided a two-dimensional optical element array, which further includes a fixing member on one of the surfaces of the substrate of the uppermost optical element array unit and between the substrates of adjacent optical element array units. The fixing member presses or mounts the optical element against or on one surface with the grooves of the substrate for alignment and fixing.

Further provided is a two-dimensional optical element array in which the fixing member presses or mounts the optical element against or onto the surface with the grooves of the substrate for alignment and fixing in such a manner that a surface of the fixing member and a surface of the substrate of the optical element array unit which faces the surface of the fixing member do not directly contact each other, and that the adjacent two units do not have a direct mechanical influence on each other.

Further provided is a two-dimensional optical element array of which optical element is pressed against or mounted on the substrate for alignment and fixing in such a manner that the optical element abuts on a surface of the fixing member and on a side wall of the groove(s).

It is also preferable that the optical element array unit(s) further include an adhesive layer disposed between the surface of the fixing member and the surface of the substrate of the optical element array unit which faces the surface of the fixing member.

It is also preferable that a thickness of the adhesive layer falls within a range from 2 to 100 μm.

It is also preferable to form a positioning guide at a predetermined position on the surface with the grooves of the substrate of the optical element array unit.

It is also preferable that the groove is a V-shaped groove.

It is preferable to slant a light-emitting end face and/or light receiving end face of the optical element of the optical element array unit by a predetermined angle (θ) with respect to a plane perpendicular to a central axis of the optical element.

It is also preferable to dispose the light-emitting end face and/or light receiving end face of the optical element in the plane perpendicular to the central axis of the optical element.

It is also preferable to dispose the light-emitting end face and/or light receiving end face of the optical element in a plane angled by a predetermined angle (θ) with respect to the plane perpendicular to the central axis of the optical element.

It is also preferable to dispose the light-emitting end face and/or light receiving end face of the optical element in a plane perpendicular to an optical axis of an emitted light and/or incident light, respectively.

According to the present invention, it is further provided with a method of measuring a core position of an optical element of the two-dimensional optical element array which comprises the steps of:

a) Measuring core positions of m rows of optical elements and measuring core positions of at least two of n columns of optical elements, in the case where m optical element array units are stacked and each optical element array unit has n channels (in the case where the optical elements are arranged in m rows and n columns).

b) Arbitrarily designating one optical element for each of the at least two columns of optical elements and measuring a distance D between the core positions of the optical elements designated (designated optical elements).

c) Calculating a positional relation among elements of a matrix of the core positions of the optical elements at four corners of a rectangular having a line segment connecting the core positions of the designated optical elements as a diagonal line thereof and calculating the core positions of all of the optical elements.

According to the present invention, there is further provided a two-dimensional waveguide apparatus, which includes a stack of a plurality of waveguide substrate units each having one or more waveguides patterned in a planar manner. The plurality of waveguide substrate units are stacked in a state such that the surfaces of the substrates of two adjacent waveguide substrates do not directly contact each other, and that the two adjacent units do not have a direct mechanical influence on each other.

There is further provided a two-dimensional waveguide apparatus which further includes an adhesive layer between the surfaces of two adjacent waveguide substrate units that face each other.

It is preferable that a thickness of the adhesive layer falls within a range from 2 to 100 μm.

It is also preferable to form a positioning guide at a predetermined location on a surface of the waveguide substrate unit.

It is also preferable to slant a light-emitting end face of each waveguide of the waveguide substrate unit by a predetermined angle (θ) with respect to a plane perpendicular to an optical axis thereof.

There is further provided a two-dimensional waveguide apparatus, in which the light-emitting end face and/or light receiving end face of the waveguide of the waveguide substrate unit is disposed in a plane perpendicular to a central axis of the waveguide.

There is also provided a two-dimensional waveguide apparatus in which the light-emitting end face and/or light receiving end face of the waveguide of the waveguide substrate unit is disposed in a plane angled by a predetermined angle (θ) with respect to the plane perpendicular to the central axis of the waveguide.

There is also provided a two-dimensional waveguide apparatus in which the light-emitting end face and/or light receiving end face of the waveguide of the waveguide substrate unit is disposed in a plane perpendicular to an optical axis of an emitted light and/or incident light, respectively.

BRIEF DESCRIPTION OF THE DRAWINGS

FIG. 17(a) is a schematic plan view, and FIG. 17(a) is a cross-sectional view taken along a line X—X in FIG. 17(a)

FIG. 20(a) being a cross-sectional view vertical to the axis of the optical fiber, and FIG. 20(b) being a cross-sectional view taken along a line X—X in FIG. 20(a).

DETAILED DESCRIPTION OF THE INVENTION

Figure 1:
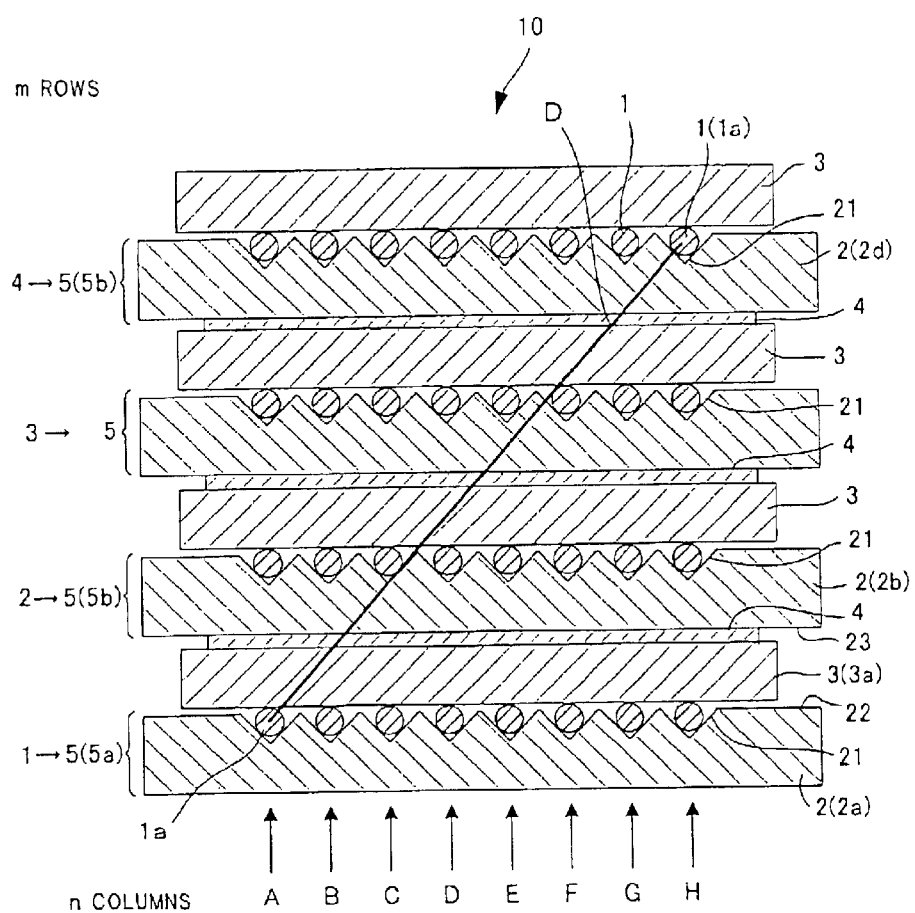
FIG. 1 is a schematic cross-sectional view of a two-dimensional optical fiber array, which is a first embodiment of a two-dimensional optical element array according to this invention.

Now, referring to the drawings, embodiments of a two-dimensional optical element array and a method of manufacturing the same of this invention will be described specifically with respect to a case where an optical element is constituted by an optical fiber.

FIG. 1 is a schematic cross-sectional view of a two-dimensional optical fiber array, which is a first embodiment of the two-dimensional optical element array according to this invention. As shown in FIG. 1, a two-dimensional optical fiber array 10 in this embodiment comprises a stack of a plurality of optical fiber array units 5 each having at least one optical fiber 1 and a substrate 2, the substrate 2 has one or more grooves 21 each suited to a profile of the optical fiber 1 on one of surfaces thereof, and one or more optical fibers 1 are aligned and fixed in the grooves 21. The optical fiber array units 5 are stacked in such a manner that surfaces of the substrates 2 of two adjacent optical fiber array units 5 face each other but do not directly contact each other, and the adjacent two units do not have a direct mechanical influence on each other. In FIG. 1, for example, an upper surface (with the grooves 21) 22 of a substrate 2a of the lowermost optical fiber array unit 5a and a lower surface (back surface) 23 of a substrate 2b of the second lowest optical fiber array unit 5b do not directly contact each other, and the adjacent two units do not have a direct mechanical influence on each other.

With such an arrangement, the alignment precision of the optical fibers on the substrate does not depend on a thickness precision of the substrate, and therefore, can be enhanced. Unlike a conventional stack of the optical fiber array units 5 having the substrates 2 brought into contact with each other, the stacking precision does not depend on the thickness precision of the substrate 2. Since the need to control the thickness precision of the substrate 2, which is extremely difficult, is eliminated, the alignment precision of the optical fibers on the substrate can be readily increased without intricacy.

In this embodiment, in addition to the fact that the alignment precision of the optical fibers does not depend on the thickness precision of the substrate, the alignment precision of the optical fibers on the substrate can be readily enhanced by positioning the optical fiber with a positioning jig or stacking the optical fiber array units 5 with cores thereof being aligned, as described later.

As shown in FIG. 1, the optical fiber array 10 of this embodiment preferably further includes fixing members 3 on one of the surfaces of a substrate 2d of the uppermost optical fiber array unit 5d and between the substrates 2 (2a, 2b, for example) of adjacent optical fiber array units 5 (5a, 5b, for example). The fixing member presses or mounts the optical fiber 1 against or on one surface with the grooves 21 of the substrate 2 (2d, 2a and 2b, for example) for fixing and alignment.

In this case, the materials of the substrate 2 and the fixing member 3 are not limited particularly. However, as a preferred example, the materials may be borosilicate glass, which is transparent.

With such an arrangement, the state where surfaces facing each other of the substrates 2 of two adjacent optical fiber array units 5 do not directly contact each other, and the adjacent two units do not have a direct mechanical influence on each other can be readily provided.

In the two-dimensional optical fiber array 10 in this embodiment, as shown in FIG. 1, the fixing member 3 preferably aligns and fixes the optical fibers 1 onto the surface with the grooves 21 of the substrate 2 in such a manner that a surface of the fixing member 3 and a surface of the substrate of the optical fiber array unit 5 which faces to that surface of the fixing member 3 do not directly contact each other, and the adjacent two units do not have a direct mechanical influence on each other. For example, in such a manner that the two surfaces of a fixing member 3a disposed on the lowermost optical fiber array unit 5a and surfaces 22, 23 of the substrates 2a, 2b of the optical fiber array units 5a, 5b, which face the two surfaces of the fixing member 3a, do not directly contact each other, and the adjacent two units do not have a direct mechanical influence on each other. In this case, as described later, a lower surface (back surface) of the fixing member 3a abuts on an upper part of the optical fiber 1 on the substrate 2a and thus is kept from contact with the surface 22, 80 that the two surfaces have no influence on each other. And, an upper surface (front surface) of the fixing member 3a abuts on an adhesive layer 4, described later, and thus is kept from direct contact with the surface 23, so that the two surfaces have no influence on each other.

With such an arrangement, it can be readily provided that the alignment precision of the optical fibers does not depend on the thickness precision of the substrate.

Figure 2:
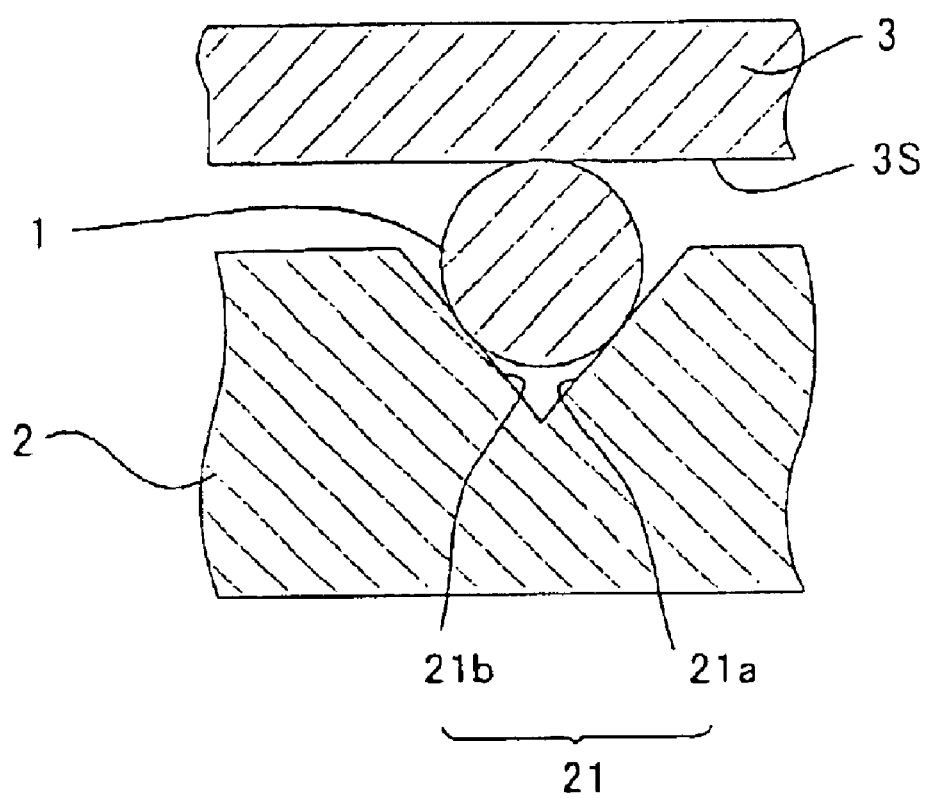
FIG. 2 is an enlarged cross-sectional view of a part of a groove in a substrate in FIG. 1.

Furthermore, as shown in FIGS. 1 and 2, in the two-dimensional optical fiber array 10 of this embodiment, the optical fiber 1 is preferably pressed against or mounted on the substrate 2 for alignment and fixing in such a manner that the optical fiber 1 abuts on side walls 21a, 21b of the groove 21 and on a surface 3s of the fixing member 3. In this way, the optical fiber abuts on the surface 3s of the fixing member 3 with the upper part thereof protruding above the surface of the substrate 2, and on the side walls 21a, 21b of the groove 21.

With such an arrangement, it can be readily provided that the alignment precision of the optical fibers is not influenced, depending on the thickness precision of the substrate.

As shown in FIG. 1, the two-dimensional optical fiber array 10 of this embodiment preferably further comprises an adhesive layer 4 between the surface of the fixing member 3 and the surface of the substrate 2 other than that with the grooves (back surface) of the optical fiber array unit 5 which faces to that surface of the fixing member 3. For example, between the upper surface (front surface) of the fixing member 3a and the surface of the substrate 2b other than that with the grooves (back surface) of the optical fiber array unit 5b).

The adhesive layer 4 used in this embodiment is not limited to a particular one. However, in the case where the substrate 2 and the fixing member 3 are made of transparent borosilicate glass or the like, it may preferably be an ultraviolet curing adhesive, for example.

While the thickness of the adhesive layer 4 depends on the type of the adhesive used, it preferably falls within a range from 2 to 100 $\mu$m, and more preferably within a range from 3 to 20 $\mu$m. If it is below 2 $\mu$m, insufficient adhesive properties may result, or the optical fiber array units may be partly brought into contact with each other if the substrate precision is low, thereby degrading the precision. If it is beyond 100 $\mu$m, an influence of thermal expansion or curing shrinkage may become negligible.

With such an arrangement, since the adhesive layer having an appropriate thickness lies between the FAs, the adhesive property of the adhesive can be elicited adequately, and thus, a good long-term reliability can be assured.

In the case of Japanese Patent No. 3108241, which discloses an optical fiber array having an accommodation section for accommodating an optical fiber presser member (equivalent to the fixing member in this invention), an adhesive layer can be partially assured between the optical fiber array units, such as at a part between the optical fiber presser member of one substrate with V-shaped grooves and another substrate with V-shaped grooves. However, in the substrate with a complicated three-dimensional configuration, various and complicated stresses are generated due to curing shrinkage of the adhesive, shrinkage or tension due to thermal fluctuation after curing, or the like, and cracking thereof may possibly be caused. In addition, peeling thereof may occur at a periphery of the abutting surface, thereby reducing the long-term reliability. On the contrary, the adhesion mechanism of the two-dimensional optical fiber array of this embodiment is a simple adhesion mechanism of two flat plates. Accordingly, such complicated stresses do not occur and a high long-term reliability is attained.

Figure 18:
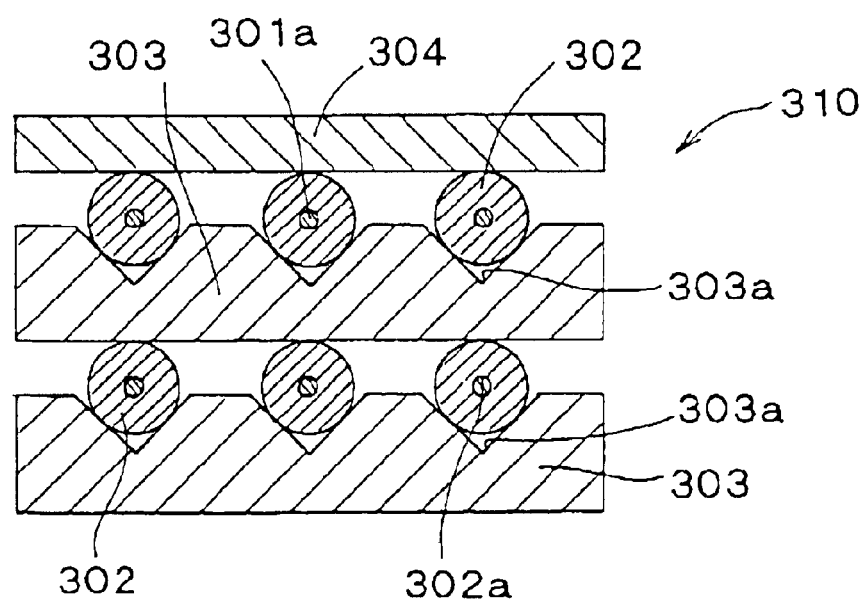
FIG. 18 is a schematic cross-sectional view of one of the embodiments of the present invention wherein an optical fiber is housed in a through hole formed in a cylindrical member in the two-dimensional optical element array.

The present two-dimensional optical element array includes an example as shown in FIG. 18 in which at least one cylindrical member 302 having a through hole 302a capable of housing an optical fiber being passed therethrough is provided. In this case, a substrate in which at least one groove 303a corresponding to the outer form of the one cylindrical member 302 is formed on at least one surface thereof may be used as a substrate 303. For example, a cylindrical member 302 having a through hole 302a is tentatively fixed to a groove 303a formed on a substrate 303 to give a ferrule. Then, an optical fiber 301a is inserted into a through hole 302a of the cylindrical member 302 in the ferrule. Finally, a two-dimensional optical element array 310 in which a plural number of cylindrical members 302 having a through hole 302a through which an optical fiber has been housed by passing it therethrough is stacked two-dimensionally on a plural number of the substrates layered may be manufactured by fixing substrates 303, cylindrical members 302 and fixing members 304 finally by means of adhering with an adhesive, or the like.

Figure 19:
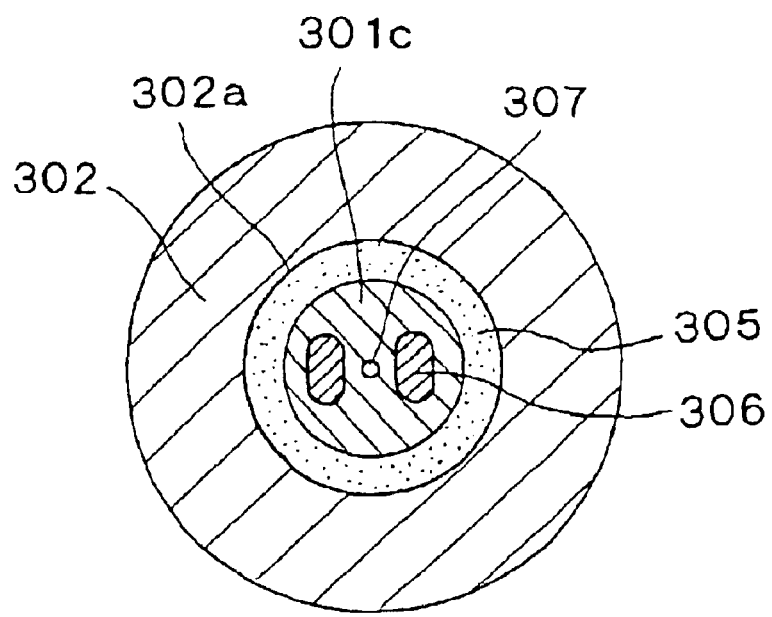
FIG. 19 is a schematic cross-sectional view of one of the embodiments of the present invention wherein an optical fiber for maintaining polarized wave is used as an optical fiber in the two-dimensional optical element array.

Since an optical fiber is usually made of a quartz, an optical fiber shows such a property that it is likely to break when a stress is concentratedly given to a damage formed on its surface. In the case of a two-dimensional optical element array 310 having such a constitution as shown in FIG. 18, the reliability as a two-dimensional optical element array may be improved since the breakage of the fiber caused by the damage formed due to the contact of the outer surface of the core with the substrates 303 and the like may be effectively protected. This is because the optical fiber 301a is aligned and fixed in a state that the fiber is housed in the cylindrical member 302. Furthermore, the work for aligning and fixing optical fibers 301a is simple and it can be shortened since it does not require a complicated operation such as taking and turning the fibers. This may improve not only the productivity, but also the reliability since the chance of the breakage caused by contacting fibers with substrates 303 and the like may be reduced. This is because the working time may be shortened as mentioned above. In case of the fiber for maintaining polarized wave 301c as shown in FIG. 19, this method is preferred in the point that the capacity in maintaining the polarized wave is not deteriorated since unnecessary stress does not occur because the stress being derived from the adhesive layers 305 and given to the fiber for maintaining polarized wave 301c is almost even. This is because the thickness of the adhesive layer around the fiber for maintaining polarized wave 301c becomes almost even since the fiber for maintaining polarized wave 301c is inserted into the through hole 302a of the cylindrical member 302, as shown in FIG. 19. In this respect, note that the numeral 306 denotes a stress giving member and the numeral 307 denotes a core.

Figure 20:
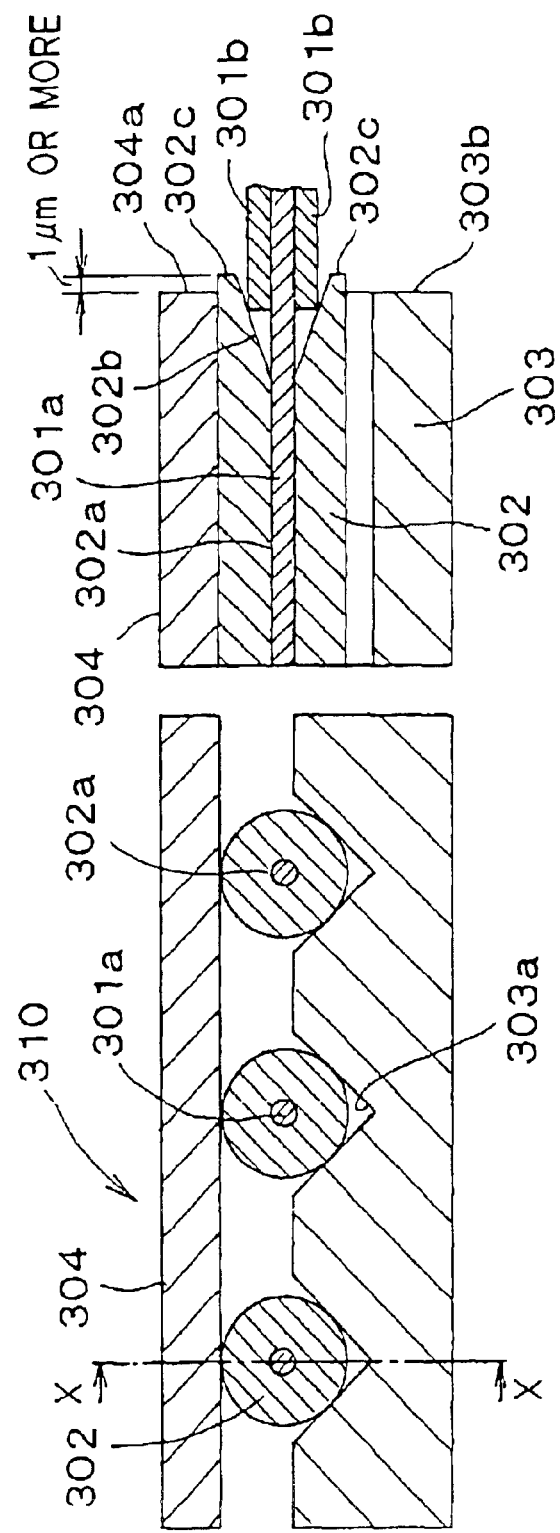
FIGS. 20(a) and (b) are a schematic cross-sectional view of another embodiment wherein an optical fiber is housed in a through hole formed in a cylindrical member in the two-dimensional optical element array according to the present invention.

In case of a two-dimensional optical element array provided with a cylindrical member, as shown in FIG. 20, it is preferred that the through hole 302a has a reverse tapered portion 302b which widens towards the opening of the hole. The bared optical fiber, obtained by peeling the outer cover 301b, is inserted at that point such that the insertion of the optical fiber 301a into the through hole of the cylindrical member may be achieved smoothly. Additionally, it is preferred that the side end portion 302c of the opening of the reverse tapered portion 302b extrudes outwardly at a length of 1 μm or more from the end of the substrate 303b and the end of the fixing member 304a. Thereby, the surface roughness of both the corresponding substrate 303b and the corresponding fixing member 304a is taken into consideration in the point that the breakage of the fiber caused by the contact with the substrate 303b and the fixing member 304a maybe effectively protected. Moreover, the extrusion of the side end portion is preferably 5 mm or less.

Any material may be used for a cylindrical member 302 without any special limitation, as far as such a material maybe subjected to an easy precise processing, and can protect sufficiently an optical fiber 301a to be housed in the through hole 302a from being damaged due to the contact with the outer environments. In the case that the fixation with the substrate 303 is carried out by using an ultraviolet curing adhesive, it is preferable to use a transparent material. For example, a borosilicate glass may be preferably used.

An outer diameter of the cylindrical member 302 may be chosen, depending upon the size of an optical fiber 301a and the like. Thus, it is difficult to easily determine an optimum size of the outer diameter thereof. However, one may use preferably a cylindrical member having an outer diameter of 0.25 to 2.7 mm. The inner diameter of the through hole 302a is preferably set at a size larger than the outer diameter of the optical fiber 301a. It is preferable to set it at the diameter of from 0.126 to 0.13 mm.

Figure 21:
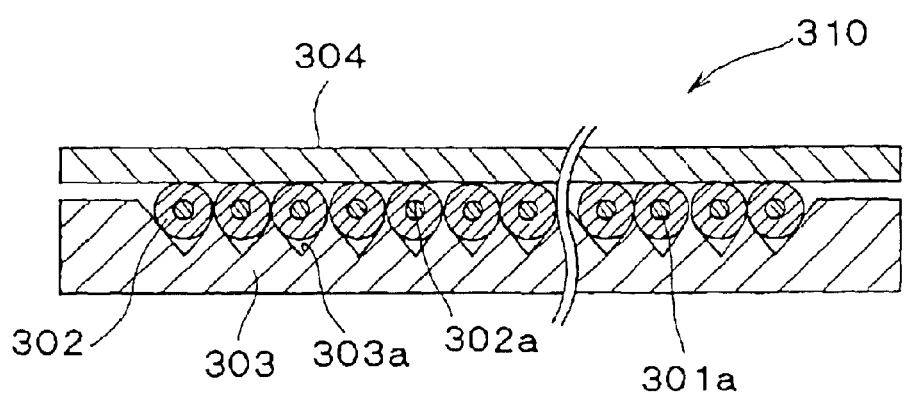
FIG. 21 is a schematic cross-sectional view of still another embodiment of the present invention wherein an optical fiber is housed in a through hole formed in a cylindrical member in the two-dimensional optical element array.

Grooves provided with cylindrical member according to the present two-dimensional optical fiber element array include, as shown already in FIG. 18, at least one groove 303a which corresponds to the outer shape of the cylindrical member. There is no limitation in the shape of the groove formed in the substrate as far as it has shape corresponding to the outer shape of the cylindrical member and aligns the cylindrical member smoothly to hold it surely. For example, a V-shaped groove capable of surely fixing the cylindrical member at three points maybe preferably used. As to the space for disposing the grooves 303a, one may dispose the grooves, as shown in FIG. 20(a), by aligning them so as to have a predetermined space between the cylindrical members. One may dispose them by aligning so as to make the cylindrical members contact intimately, as shown in FIG. 21, as well.

Figure 22:
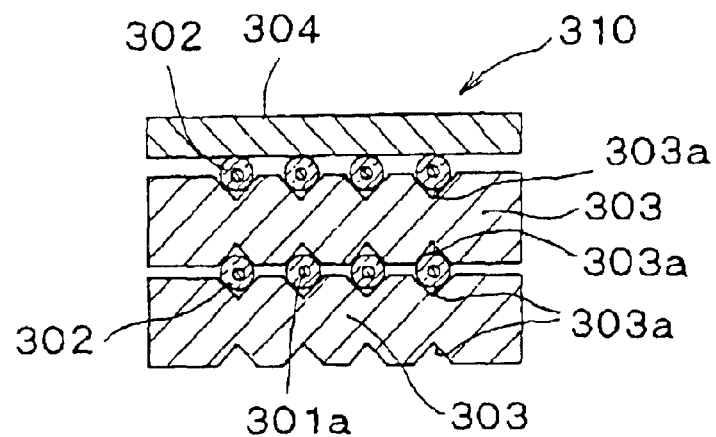
FIG. 22 is a schematic cross-sectional view of still another embodiment of the present invention wherein an optical fiber is housed in a through hole formed in a cylindrical member in the two-dimensional optical element array.

The substrate provided with cylindrical member according to the present two-dimensional optical fiber element array may have, on the both surfaces, for example as shown already in FIG. 22, grooves 303a capable of aligning cylindrical members 302 and corresponding to the outer shape of the cylindrical member 302. The grooves 302a are disposed in almost the same shape as each other and almost at an equal distance. One may manufacture a two-dimensional optical fiber element array 310 wherein two sheets of the substrates are disposed layered by facing the grooves 303a toward each other, a cylindrical member 302 is sandwiched and aligned between the two substrates 303, and another cylindrical member 302 is aligned and fixed on the upper surface of the upper substrate 303, by using this type of the substrate.

Figure 23:
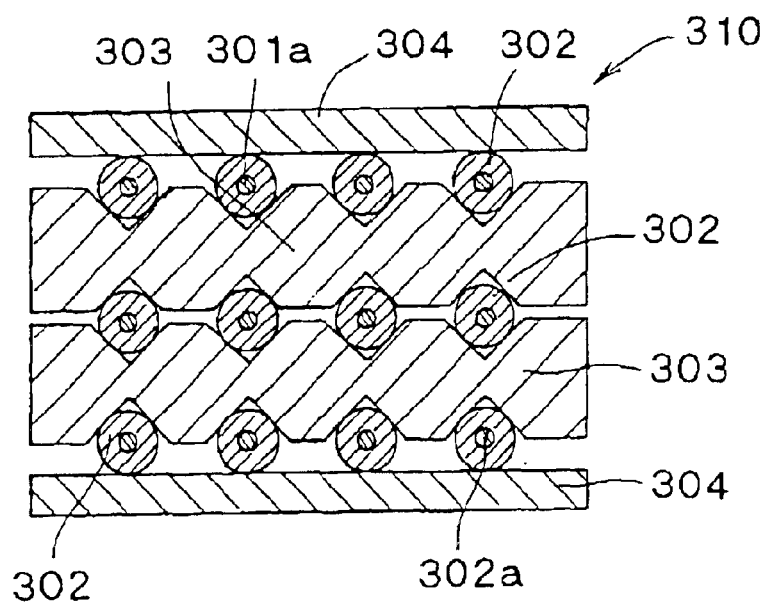
FIG. 23 is a schematic cross-sectional view of still another embodiment of the present invention wherein an optical fiber is housed in a through hole formed in a cylindrical member in the two-dimensional optical element array.

In case of a substrate having grooves on both surfaces as shown in FIG. 22, one may make the positioning of the cylindrical member(s) 302 on the substrate 303 precisely and easily by processing the grooves 302a quite precisely on the both surfaces thereof almost in the same shape and the same disposing distance. Accordingly, one may manufacture a two-dimensional optical fiber element array 310 having the cylindrical members 303 on both surfaces positioned in a higher preciseness to each other, compared with the substrate 303 shown in FIG. 18. This is because one may set more precisely the distances from the center to the center among the upper and lower cylindrical members 303 disposed two-dimensionally and layered in relationship with the cylindrical members 303 facing each other or adjacent each other. Furthermore, one may also set more precisely the distances from the center to the center among the upper, middle and lower cylindrical members 303 disposed three-layered in relationship with the cylindrical members 303 facing each other or adjacent each other by disposing and aligning the cylindrical member 303 on the lower surface of the lower substrate, as shown in FIG. 23.

Figure 3:
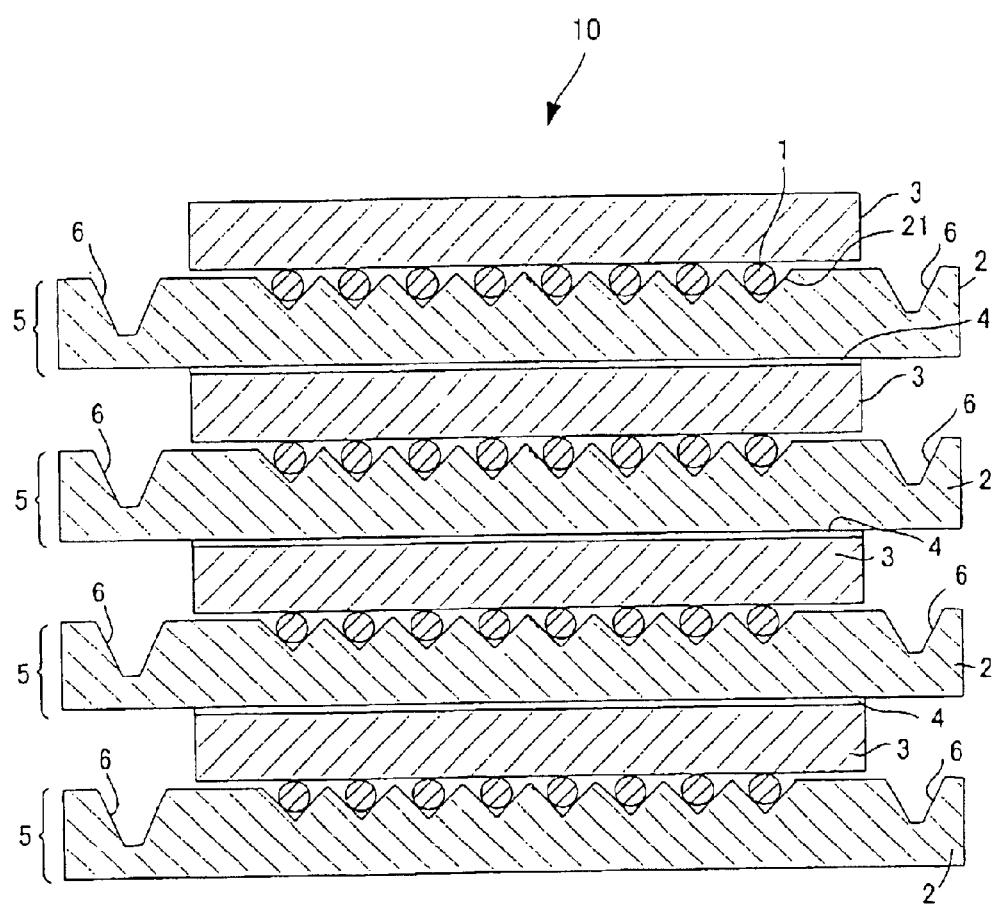
FIG. 3 is a schematic cross-sectional view of a two-dimensional optical fiber array, which is a second embodiment of the two-dimensional optical element array according to this invention.

FIG. 3 is a schematic cross-sectional view of a two-dimensional optical fiber element array, which is a second embodiment of the two-dimensional optical element array according to this invention. As shown in FIG. 3, the two-dimensional optical fiber array 10 preferably further includes a positioning guide 6 formed at a predetermined position on the surface with the grooves 21 of the substrate 2 of the optical fiber array unit 5. The positioning guide 6 shown in FIG. 3 is formed on the surface of the substrate 2 having the grooves 21 formed therein, and thus can be efficiently machined simultaneously with the grooves 21.

With such an arrangement, the optical fiber array units 5 can be readily positioned with an appropriate positioning jig (not shown) or stacked with the cores thereof aligned, and thus, the alignment precision of the optical fibers on the substrate can be enhanced.

The groove used in the embodiments described above can have any configuration so far as it is suited to the profile of the optical fiber 1 and can align the optical fibers 1 smoothly and fix them with reliability. However, it is preferably a V-shaped groove capable of supporting the optical fiber 1 at three points.

In the manufacture of the two-dimensional optical fiber array of the above described embodiment, an optical fiber array unit is fabricated first, which is a set of a substrate and one or more optical fibers aligned and fixed in the grooves thereof. This is a usual process of aligning and fixing the optical fibers on one surface of the substrate, and thus the risk of cutting the optical fiber, for example, is low. Also when stacking, the optical fibers are stacked in the form of the optical fiber array unit, and therefore the risk of cutting the optical fiber is low. Furthermore, the stacking is carried out independently, so that the positioning is relatively readily carried out. Currently, some two-dimensional optical fiber arrays (2DFA) are needed to have about 1000 cores (for example 32×32). As the number of the cores is increased, the advantage of being capable of assembly without cutting becomes more remarkable.

Figure 4A:
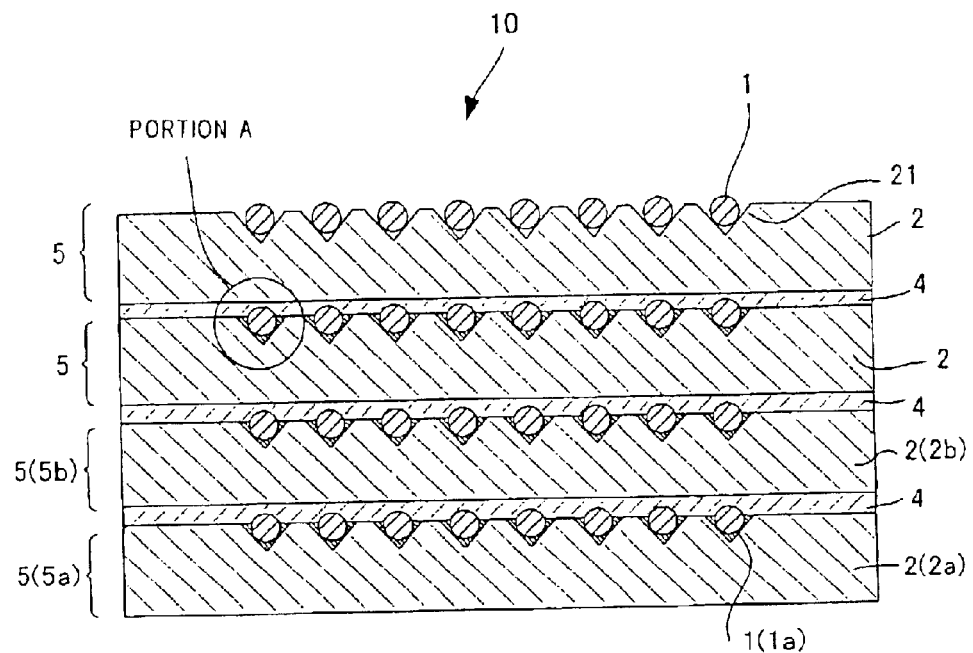
FIG. 4(a) is a schematic cross-sectional view of a two-dimensional optical fiber array, which is a third embodiment of the two-dimensional optical element array according to this invention.
Figure 4B:
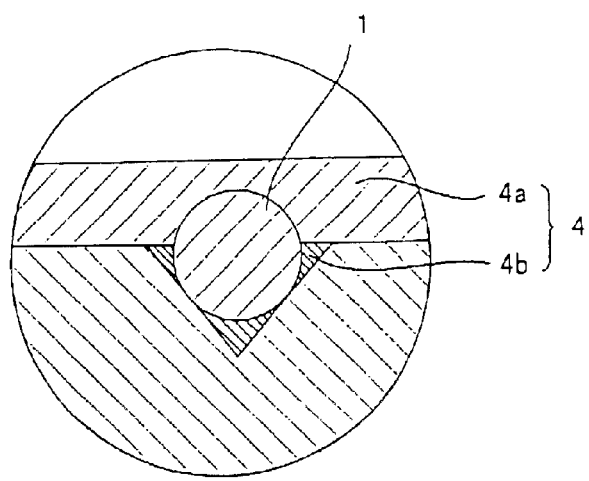
FIG. 4(b) is an enlarged schematic cross-sectional view of the portion A in a two-dimensional optical fiber array shown in FIG. 4(a).

FIG. 4 is a schematic cross-sectional view of a two-dimensional optical fiber array (with no fixing member 3 (see FIG. 1)), which is a third embodiment of the two-dimensional optical element array according to this invention. As shown in FIG. 4, the two-dimensional optical fiber array 10 may comprise a plurality of optical fiber array units 5 stacked in such a manner that an adhesive layer 4 (4a, 4b) is interposed between an apex of an optical fiber 1 arranged on a substrate 2 and a surface of another substrate 2 (2a, 2b)

opposing thereto. The apex of the optical fiber 1 and the surface of the substrate 2 (2a, 2b) are brought into contact with the adhesive layer 4 (4a, 4b), and the surfaces facing each other of the substrates 2 (2a, 2b) of adjacent optical fiber array units 5 (5a, 5b) do not directly contact each other, and the adjacent two units do not have a direct mechanical influence on each other. Here, the adhesive layer 4a connects and fixes the optical fiber array units 5 with each other, and the adhesive layer 4b connects and fixes the substrate 2 and the optical fiber 1 with each other. The adhesive layer may be omitted, as far as there can be realized the state where the surfaces facing each other of adjacent substrates 2 (2a, 2b) do not directly contact each other, and the adjacent two units do not have a direct mechanical influence on each other.

Figure 5:
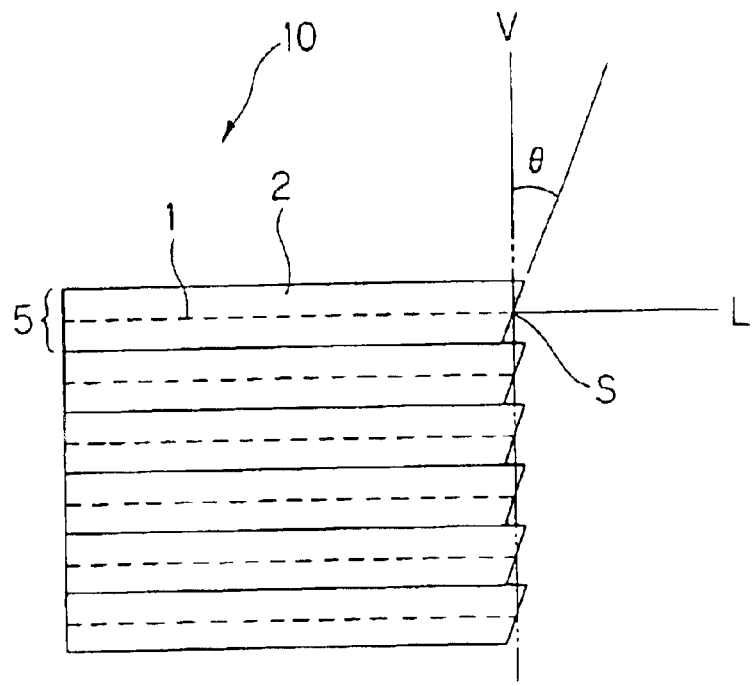
FIG. 5 is a schematic cross-sectional view of a two-dimensional optical fiber array, which is a fourth embodiment of the two-dimensional optical element array according to this invention.
Figure 6:
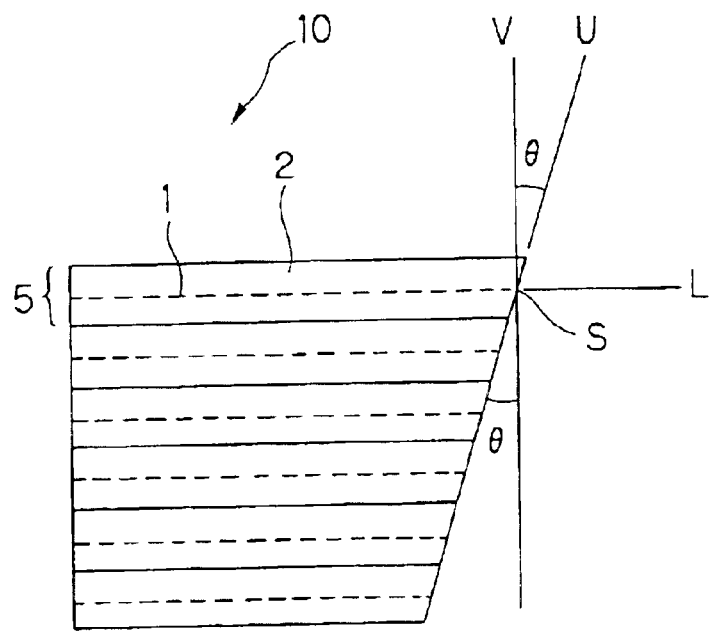
FIG. 6 is a schematic cross-sectional view of a two-dimensional optical fiber array, which is a fifth embodiment of the two-dimensional optical element array according to this invention.

FIGS. 5 and 6 are schematic cross-sectional views of two-dimensional optical fiber arrays, which are fourth and fifth embodiments of the two-dimensional optical element array according to this invention. As shown in FIGS. 5 and 6, in the two-dimensional optical fiber array 10 in these embodiments, the optical fiber 1 of the optical fiber array unit 5 has a light-emitting end face S slanted by a predetermined angle (θ) with respect to a plane V perpendicular to a central axis L of the optical fiber. While only the light-emitting end face S is slanted in FIGS. 5 and 6, a light-receiving end face may be slanted, or both the light-emitting end face S and the light-receiving end face may be slanted.

With such an arrangement, the reflection characteristics of the end face of the optical element (optical fiber) on the substrate for receiving or emitting light can be enhanced and maintained for a long period, and a loss of quantity of light and an adverse effect to another device can be prevented. That is, the light is reflected toward the outside of the optical fiber core, so that it is not launched into the original fiber, and thus, good reflection characteristics can be attained. In addition, since, in order to enhance the reflection characteristics, the optical fiber is directly machined to have a slanting on light-emitting end face, any peeling or degradation, which would be found in the AR coating film, does not occur. For an intense light, it is only a matter of durability of the optical fiber, and the slanting itself is not a disadvantage. Besides, the slanting end face can be formed by simply polishing the end face in a slanting direction, and therefore, is superior in cost savings.

In this case, the light-emitting end faces S and/or light-receiving end faces of the optical fibers 1 may be disposed in the plane V perpendicular to the central axes of the optical fibers 1, as shown in FIG. 5. Alternatively, as shown in FIG. 6, the light-emitting end faces S and/or light-receiving end faces of the optical fibers 1 may be disposed in a plane U angled at a predetermined angle (θ) with respect to the plane V perpendicular to the central axes of the optical fibers 1. While the end faces are slanted by a predetermined angle in a column direction (thickness direction) in FIGS. 5 and 6, the end faces may be slanted in a row direction (width direction).

As described above, the 2DFA often involves lens coupling, for which a close investigation of the optical system is required. For example, in the case where light is input to a lens in a slanting direction, an allowable limit of an angle deviation (<θ) (which is a deviation of an optical axis of a planar microlens from the optical axis of the light emitted from the optical fiber (light launched into the planar microlens)) is on the order of 15 degrees, depending on characteristics of the lens (if the light is launched into the lens at a right angle, <θ=0°). If the angle deviation (<θ) is larger than 15 degrees, the coupling has to be accomplished with a closer tolerance, and a loss occurs in practice. Therefore, from the viewpoint of operability of the optical system, the angle deviation (<θ) is preferably 10 degrees or less.

Figure 7:
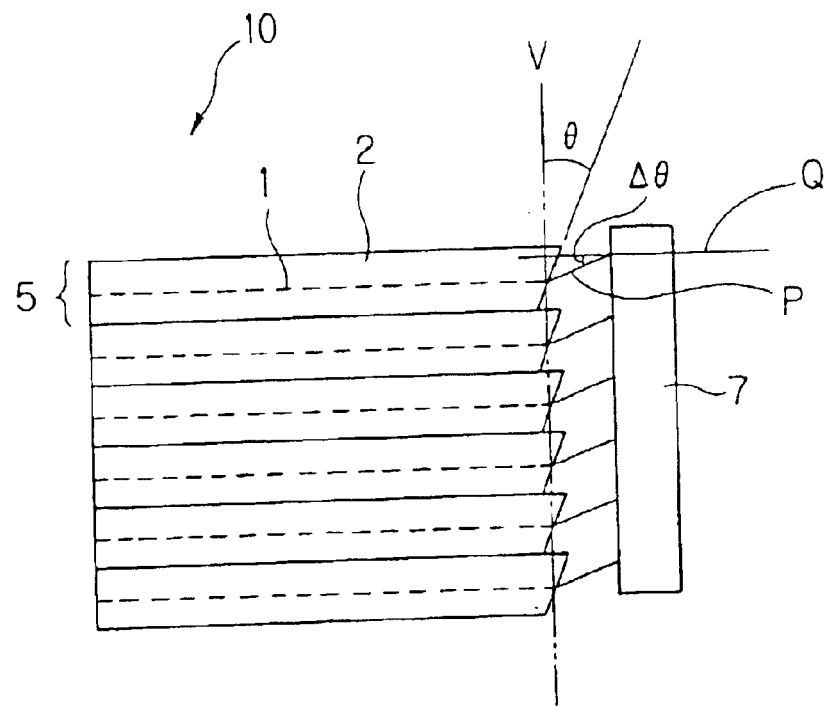
FIG. 7 is a cross-sectional view illustrating a relationship between reflection characteristics and an angle deviation (<θ) of the two-dimensional optical fiber array of the fourth embodiment shown in FIG. 5.

As shown in FIG. 7, in the fourth embodiment shown in FIG. 5, if the slant angle θ of the end faces S of the optical fibers 1 is set at 8 degrees, and a common quartz SM fiber (with a refractive index of 1.45) and a planar microlens 7 are used for spatial lens coupling, an equal focal length can be attained for the optical fibers 1 without slanting the planar microlens 7, because the end faces S of the optical fibers 1 are arranged in the plane V perpendicular to the central axes L thereof. In this case, if conditions are the same as conventional, the angle deviation (<θ) is small, specifically 3.6 degrees, which facilitates coupling with high efficiency.

Here, the angle deviation (<θ) can be calculated from the following equation (1).

(Equation 1)

$$<\theta = -\sin^{-1}(1.45 \times \sin\theta) + \theta \ldots \quad (1)$$

If the angle θ is set at 8 degrees, the angle deviation (<θ) of the optical axis Q of the planar microlens from the optical axis P of the light emitted from the optical fiber 1 is 3.6 degrees from the equation (1).

Figure 8:
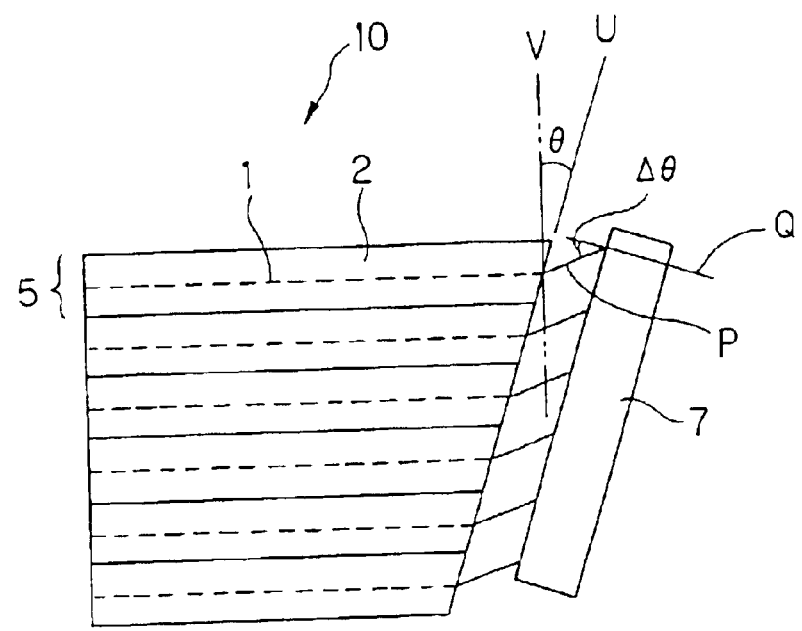
FIG. 8 is a cross-sectional view illustrating a relationship between reflection characteristics and an angle deviation (<θ) of the two-dimensional optical fiber array of the fifth embodiment shown in FIG. 6.

As shown in FIG. 8, if the angle θ is similarly set at 8 degrees, and a common quartz SM fiber (with a refractive index of 1.45) is used for spatial lens coupling, the angle deviation (<θ) of the optical axis Q of the planar microlens from the optical axis P of the light emitted from the optical fiber 1, calculated from the equation (1), is 11.6 degrees. In this case, to provide an equal focal length for the optical fibers, the planar microlens 7 shown is slanted to be parallel to the end faces S of the optical fibers, that is, by 8 degrees.

To prevent a light from being reflected back to (input again to) the end face S of the optical fiber in the 2DFA, if a common quartz fiber is used, it is only required to provide the slant angle of the end face equal to or more than 8 degrees. Besides, to provide the angle deviation (<θ) equal to or less than 15 degrees, if the common quartz fiber is used, it is only required to provide the slant angle θ of the end face of the optical fiber equal to or less than 28 degrees in the fourth embodiment shown in FIG. 5, or to provide the slant angle of the end face of the optical fiber equal to or less than 15 degrees in the fifth embodiment shown in FIG. 6. Furthermore, to provide the angle deviation (<θ) equal to or less than 10 degrees, it is only required to provide the slant angle θ equal to or less than 20 degrees in the fourth embodiment shown in FIG. 5.

Figure 9:
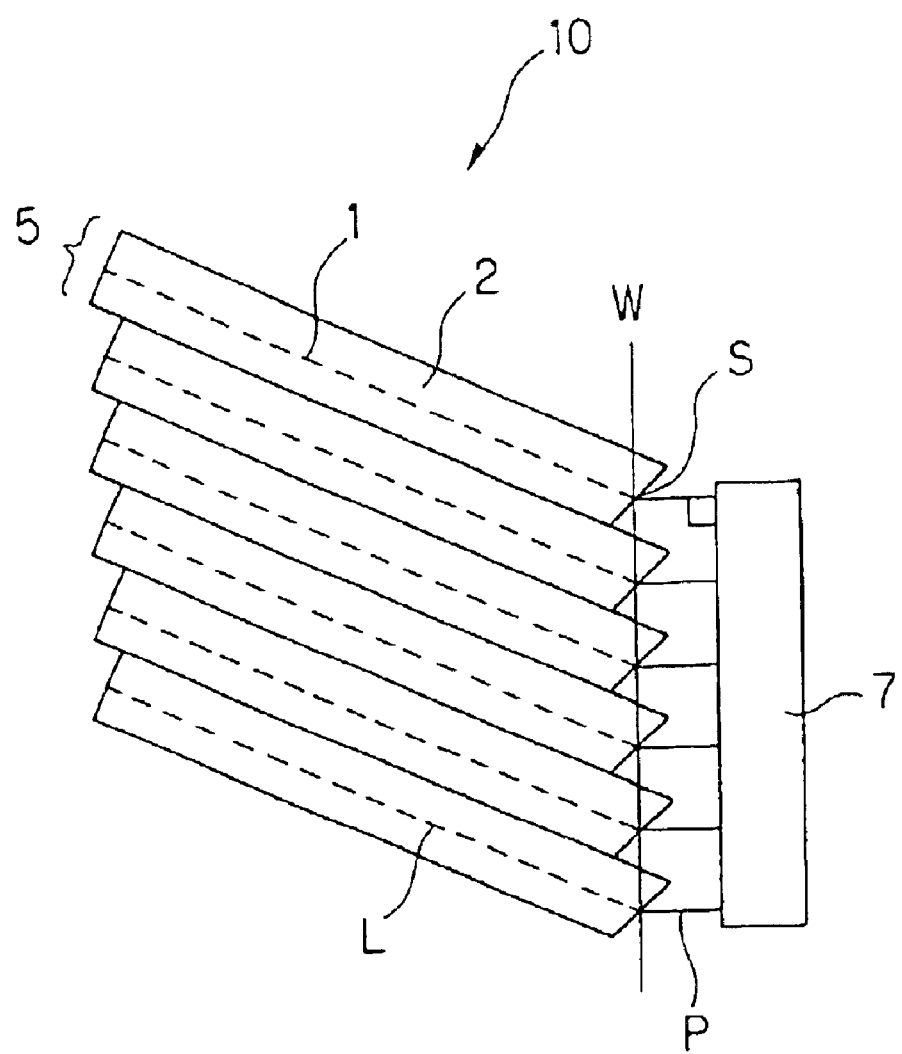
FIG. 9 is a schematic cross-sectional view of a two-dimensional optical fiber array, which is a sixth embodiment of the two-dimensional optical element array according to this invention.

FIG. 9 is a schematic cross-sectional view of a two-dimensional optical fiber array, which is a sixth embodiment of the two-dimensional optical element array according to this invention. As shown in FIG. 9, the light-emitting end faces S and/or light-receiving end faces of the optical fibers 1 are arranged in a plane w perpendicular to the optical axis P of the incident or emitted light. Here, FIG. 9 shows a case where the light-emitting end faces S are arranged in the plane W perpendicular to the optical axis P of the emitted light.

With such an arrangement, the light is input to the planar microlens 7, for example, at a right angle. Therefore, the optical system can be simplified, thereby enhancing the operability thereof, and variations in optical length can be eliminated.

In any embodiment described above, a lens array in the planar microlens 7 typically has a regular pitch. If the orientations and angles of the angled layers are different from each other, the light beams are not input to or emitted from the respective layers light with a regular pitch, and thus, the orientations and angles of the respective angled layers are preferably the same.

A recent cross-connect switch has been required to realize extremely quick switching. If there are variations in switching optical path length, variations in switching time disadvantageously result. Thus, it is important to provide an equal switching optical path length. While a conventional arrangement results in variations in the switching optical path length, this embodiment can provide an equal switching optical path length. It can be said that this embodiment is particularly advantageous in an application where an equal optical path length is required as in the case shown in FIG. 5.

Figure 10A:
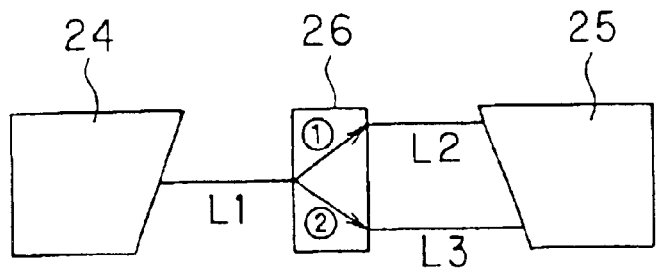
FIG. 10 schematically illustrates an arrangement of a simple in-line switch.
Figure 10B:
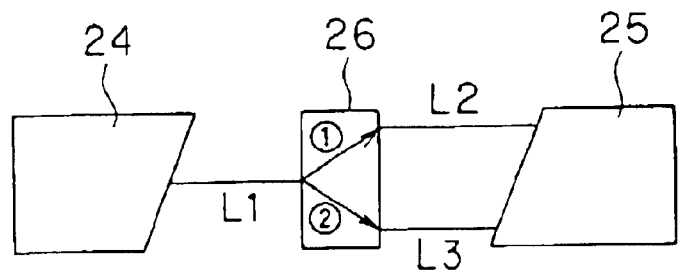
Figure 10C:
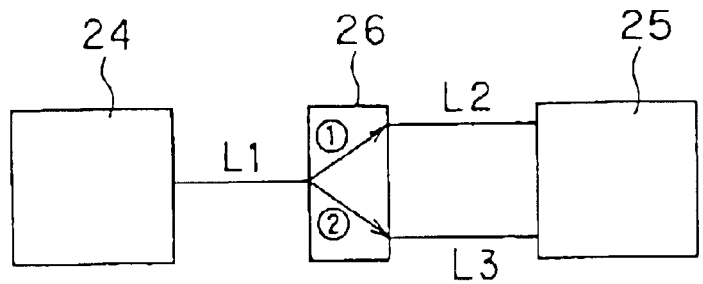

In FIG. 10, there is schematically shown an arrangement of a simple in-line switch. Here, since the switching element depends on the arrangement and method adopted, the optical path length in the element is not taken into consideration. In the arrangement shown in FIG. 10, an optical path length from an input-side fiber array 24 to an in-line optical switch 26 is denoted by L1, and optical path lengths from the in-line optical switch 26 to an output-side fiber array 25 are denoted by L2 and L3. Then, a total optical path length is L1+L2 in the case of switching (1), or L1+L3 in the case of switching (2). In the arrangement shown in FIGS. 10(*a*) and 10(*b*), the lengths L2 and L3 are not the same, and therefore, the total optical path length varies depending on switching ((1) or (2)). On the contrary, in the arrangement shown in FIG. 10(*c*), the lengths L2 and L3 are the same, and therefore, the total optical path length does not vary depending on switching. Thus, it can be said that this arrangement is more advantageous in an application where an equal optical path length is required.

For example, the MEMS switch has typically a large inter-element pitch of the order of 3 mm to reduce a loss and crosstalk. Assuming that the 2DFA has 10 columns and 10 rows and the slant angle of the end face of the optical fiber is 8 degrees, a pitch from a first layer to a tenth layer is 27 (3×9) mm, and thus, the optical path length difference |L−1| is 3.8 (27×tan 8) mm, which cannot be neglected. Since the optical path length difference depends on the slant angle of the optical fiber end face, the optical fiber pitch or the like, it cannot be uniquely determined. However, it can be said that this embodiment is preferred in the case where the optical path length difference |L−1| is equal to or more than 1 mm.

Now, referring to FIGS. 1 to 3, a method of manufacturing a two-dimensional optical element array (optical fiber array) of this invention will be described.

For example, a method of manufacturing a two-dimensional optical fiber array 10 of this invention comprises the steps of: Forming an optical fiber array unit 5 by aligning and fixing one or more optical fibers 1 on a substrate 2 having, on one surface thereof, one or more grooves 21 each suited to a profile of the optical fiber 1. Stacking a plurality of optical fiber array units 5, characterized in that the optical fiber array units 5 are stacked in a state that surfaces of the substrates 2 of two adjacent optical fiber array units 5 facing each other do not directly contact each other. Additionally, the adjacent two units do not have a direct mechanical influence on each other. For example, as shown in FIG. 1 in a state that an upper surface (with the grooves 21) 22 of a substrate 2*a* of the lowermost optical fiber array unit 5*a* and a lower surface (back surface) 23 of a substrate 2*b* of the second lowest optical fiber array unit 5*b* do not directly contact each other, and the adjacent two units do not have a direct mechanical influence on each other (the same thing applies to other substrates).

Thus, in the manufacture of the two-dimensional optical fiber array, as described above, an optical fiber array unit is fabricated first, which is a set of a substrate and one or more optical fibers aligned and fixed in the grooves thereof. This is a usual process of aligning and fixing the optical fibers on one surface of the substrate, and thus the risk of cutting the optical fiber, for example, is low. Also when stacking, the optical fibers are stacked in the form of the optical fiber array unit, and therefore the risk of cutting the optical fiber is low. Furthermore, the stacking is carried out independently, so that the positioning is relatively readily carried out. Currently, some two-dimensional optical fiber arrays (2DFA) are needed to have about 1000 cores (for example 32×32). As the number of the cores is increased, the advantage of being capable of assembly without cutting becomes more remarkable.

In this case, preferably, during or after aligning and fixing the one or more optical fibers 1 to form the optical fiber array unit 5, a plurality of fixing members 3 for pressing or mounting the optical fiber 1 against or on one surface with the grooves 21 of the substrate 2 (2*d*, 2*a* and 2*b*, for example) for fixing and alignment are disposed on one of surfaces of a substrate 2*d* of the uppermost optical fiber array unit 5*d* and between the substrates 2 (2*a*, 2*b*, for example) of adjacent optical fiber array units 5 (5*a*, 5*b*, for example), and then, a plurality of optical fiber unit arrays 5 with the fixing members 3 are stacked.

The fixing members 3 are preferably disposed on one surface of the substrate 2 and between the substrates 2 in such a manner that a surface of the fixing member 3 and a surface of the substrate 2 of the optical fiber array unit 5 which faces to that surface of the fixing member 3 do not directly contact each other, and the adjacent two units do not have a direct mechanical influence on each other. For example, as shown in FIG. 1 in such a manner that the two surfaces of a fixing member 3*a* disposed on the lowermost optical fiber array unit 5*a* and surfaces 22, 23 of the substrates 2*a*, 2*b* of the optical fiber array units 5*a*, 5*b*, which face to that two surfaces of the fixing member 3*a*, respectively, do not directly contact each other, and the adjacent two units do not have a direct mechanical influence on each other.

The optical fiber 1 is preferably pressed against or mounted on the substrate 2 for alignment and fixing in such a manner that the optical fiber 1 abuts on a surface of the fixing member 3 and side walls 21*a*, 21*b* of the groove 21.

When stacking a plurality of optical fiber array units 5 with the fixing members 3, an adhesive layer 4 is preferably provided between the surface of the fixing member 3 and the surface other than that with the grooves (back surface) of the substrate 2 of the optical fiber array unit 5 which face to that surface of the fixing member 3 (for example, between the upper surface (front surface) of the fixing member 3*a* and the surface other than that with the grooves (back surface) of the substrate 2*b* of the optical fiber array unit 5*b*).

The thickness of the adhesive layer 4 preferably falls within a range from 2 to 100 $\mu$m.

The substrate 2 of the optical fiber array unit 5 having a positioning guide 6 formed at a predetermined position in the surface with the grooves 21 is preferably used. The groove 21 is preferably a V-shaped groove.

When manufacturing the optical fiber array 10 with no fixing member 3 (see FIG. 1) as shown in FIG. 4, a plurality of optical fiber array units may be stacked in such a manner that the apexes of the optical fibers arranged on the substrate of one optical fiber array unit are brought into contact with a surface of the substrate of the optical fiber array unit opposing thereto. Thereby, the surfaces facing each other of the substrates of two adjacent optical fiber array units do not directly contact each other, and the adjacent two units do not have a direct mechanical influence on each other. Alternatively, a plurality of optical fiber array units may be stacked in such a manner that an adhesive layer is interposed between the apexes of the optical fibers arranged on the substrate of one optical fiber array unit and a surface of the substrate of the optical fiber array unit opposing thereto. The apexes of the optical fibers and the surface of the substrate are brought into contact with the adhesive layer, thereby the surfaces facing each other of the substrates of adjacent optical fiber array units do not directly contact each other, and the adjacent two units do not have a direct mechanical influence on each other.

In this case, a temporary fixing member (not shown) can be used to make the optical fiber abut against the V-shaped groove in the step of fabricating each optical fiber array unit. After the assembly of the optical fiber array unit, the temporary fixing member can be removed to stack the optical fiber array units. In this case, removal of the temporary fixing member can be facilitated if the fixing member is made of fluororesin, such as tetrafluoroethylene, or a mold release agent is applied on the substrate.

With such an arrangement with no fixing member, the total thickness of the optical fiber array can be readily reduced. In general, the pitch in the thickness direction (stacking direction) depends on the thickness of each optical fiber array unit and cannot be less than that. To make the pitch narrower, each optical fiber array unit has to be made thinner. However, there is a limit in terms of strength. In the case where each optical fiber array unit comprises the substrate and the fixing member, a limit thickness thereof is a sum of a limit thickness of the substrate and a limit thickness of the fixing member. If the fixing member is omitted, however, the limit thickness of each optical fiber array unit is equal to the limit thickness of the substrate, and accordingly, the pitch in the thickness direction (stacking direction) can be reduced. Specifically, the limit thickness of the substrate is on the order of 0.5 mm, and the limit thickness of the fixing member is on the order of 0.4 mm. Thus, the limit thickness of the optical fiber array unit, which would be about 0.9 mm if it comprises the substrate and the fixing member, can be reduced to about 0.5 mm by omitting the fixing member.

Another advantage of the fact that the fixing member is omitted (each optical fiber array unit comprises the substrate and the optical fibers) is that an adverse effect due to a high coefficient of thermal expansion ($\alpha$) of the adhesive layer can be avoided. If the fixing member is used, it is also needed to bond the substrate and the fixing member with the adhesive layer. Experimentally, the adhesive layer preferably has a thickness of the order of 30 $\mu$m, and the adhesive layer between the optical fiber array units has a thickness of the order of 10 $\mu$m. The total thickness of the adhesive layer for one layer is on the order of 40 $\mu$m, and thus, the effect of the coefficient of thermal expansion ($\alpha$) of the adhesive layer cannot be neglected. Specifically, if the coefficient of thermal expansion ($\alpha$) of the adhesive layer used in this embodiment is on the order of $10 \times 10^{-6}$, borosilicate glass (manufactured by Corning Incorporated, trade name: Pyrex) is used for the substrate, and the pitch is 1.5 mm (a case of Example 1 described later), the whole two-dimensional optical fiber array including the adhesive layers between the substrates and the fixing members has different coefficients of thermal expansion ($\alpha$) in the width direction and in the thickness direction, specifically, $33 \times 10^{-7}$ in the width direction and $58 \times 10^{-7}$ in the thickness direction. Since the MEMS optical switch or the like is formed on a surface of silicon (Si) or the like, it essentially should not have a direction dependency of thermal expansion, and thus, the above-described direction dependency of thermal expansion may become a problem.

To solve this problem, the adhesive layer can be reduced in thickness. If the fixing member is omitted, the thickness of the adhesive layer can be reduced without any other special measures. The thickness of the adhesive layer between the optical fiber array units is about 10 $\mu$m. One reason for this is that, according to a common manufacturing method, the substrate and the fixing member each have a variation in thickness on the order of $\pm 3$ $\mu$m. Therefore, a variation in thickness thereof on the order of $\pm 6$ $\mu$m needs to be taken into account for each optical fiber array unit. In other words, the thickness of the adhesive layer between the optical fiber array units on the order of 10 $\mu$m implies that the thickness of the adhesive layer approximately falls within a range of $10 \pm 6$ $\mu$m, and is, at the minimum, about 4 $\mu$m. If the fixing member is omitted, only the variation in thickness of the substrate on the order of 3 $\mu$m needs to be taken into account. Thus, in order to assure the minimum thickness of 4 $\mu$m, it is sufficient that the thickness of the adhesive layer approximately falls within a range of $7 \pm 3$ $\mu$m, and in other words, the adhesive layer has a thickness on the order of 7 $\mu$m. That is, the thickness of the adhesive layer per layer in this case is on the order of 7 $\mu$m. In this case, the coefficient of thermal expansion ($\alpha$) in the thickness direction is $37 \times 10^{-7}$, and the direction dependency of thermal expansion can be neglected.

As shown in FIGS. 5 and 6, when manufacturing the two-dimensional optical fiber array of this invention, the light-emitting end face S and/or light-receiving end face of the optical fiber 1 of the optical fiber array unit 5 may be slanted by a predetermined angle ($\theta$) with respect to the plane V perpendicular to the central axis L of the optical fiber 1. In this case, the light-emitting end faces S and/or light-receiving end faces of the optical fibers 1 may be disposed in the plane V perpendicular to the central axes L of the optical fibers, as shown in FIG. 7. Alternatively, as shown in FIG. 8, the light-emitting end faces S and/or light-receiving end faces of the optical fibers 1 may be disposed in the plane U angled at a predetermined angle ($\theta$) with respect to the plane V perpendicular to the central axes L of the optical fibers. Furthermore, as shown in FIG. 9, the light-emitting end faces S and/or light-receiving end faces of the optical fibers 1 may be disposed in the plane W perpendicular to the optical axes P of the emitted light and/or the incident light.

With such an arrangement, it is possible to manufacture, efficiently and at low cost, the two-dimensional optical element array which has superior reflection characteristics of the light-emitting or light-receiving end face of the optical element on the substrate, and can maintain the superior reflection characteristics for a long period and prevent a loss of quantity of light and an adverse effect to another device.

For example, the light-emitting or light-receiving end face S of the optical fiber may be slanted as follows: optical fibers are incorporated with each optical fiber array unit and fixed thereto with an adhesive; the end faces S are polished with a lap polisher or the like, as in the case of a typical one-dimensional optical fiber array, in such a manner that the end faces S are inclined by a desired angle with respect to the surface plate of the lap polisher; and thus, the end faces can have a slant of the desired angle.

A two-dimensional optical fiber array formation (2DFA formation) after the two-dimensional optical fiber array unit is fabricated in the method of manufacturing a two-dimensional optical fiber array of this invention will be described in detail below.

A first method of two-dimensional optical fiber array formation may be to stack and fix the optical fiber array units while actively adjusting them. For example, the optical fiber array units may be stacked and fixed with an adhesive or the like while inputting white light into the light-emitting or light-receiving end faces of the two-dimensional optical fiber array units at the side opposite to the light-receiving or light-emitting end faces thereof, observing light emitted from the optical fibers with a CCD camera to know the positions of the optical fibers, and adjusting relative positions between the optical fiber array units. If a plurality of optical fiber array units are stacked and fixed simultaneously, a large-scale apparatus needs to be used. Therefore, the stacking and fixing thereof are preferably carried out one after another.

A device for securely holding the optical fiber array unit is preferably used to prevent a displacement from the determined position thereof due to curing shrinkage when the adhesive is cured.

Figure 11:
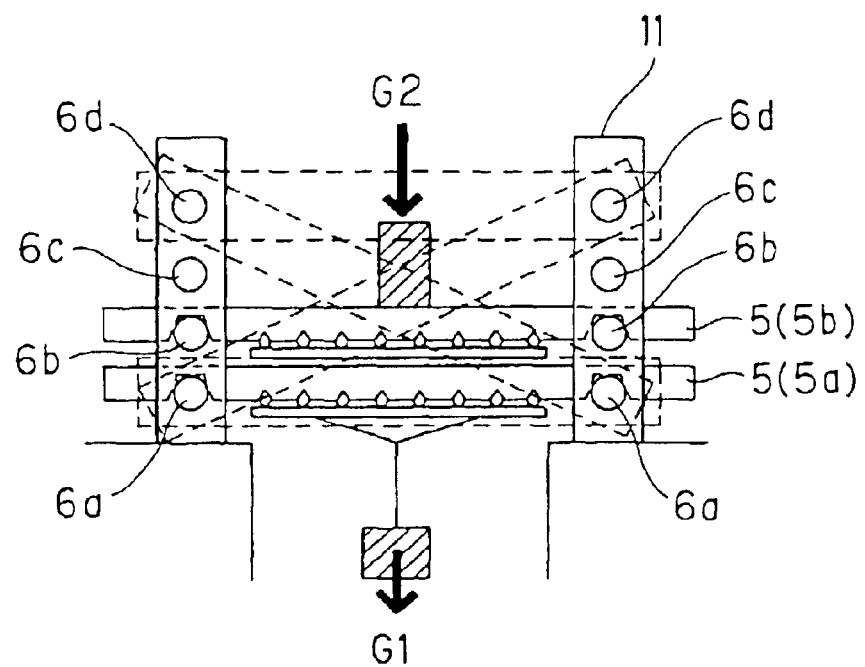
FIG. 11 is a cross-sectional view for schematically illustrating a guide pin jig used to provide a two-dimensional configuration of the two-dimensional optical fiber array, which is an embodiment of the two-dimensional optical element array of this invention.

For example, a method involving a guide pin jig, as shown in FIG. 11, is suitable. As shown in FIG. 11, first, the lowermost optical fiber array unit 5a is disposed between first guide pins 6a and second guide pins 6b, one each of which is provided on each of two vertical beam jigs of a guide pin jig 11. Then, in order to assure contact between the guide pins and guide grooves of the V-shaped grooved substrate of the FA, a load G1 is exerted on the lowest optical fiber array unit 5a by pulling the same downwardly. Next, the second lowest optical fiber array unit 5b is disposed between the second guide pins 6b and third guide pins 6c, and in order to assure contact between the guide pins and the guide grooves of the V-shaped grooved substrate of the FA, a load G2 is exerted on the optical fiber array unit 5b by pressing the same from above. In this state, an ultraviolet curing adhesive is spread between the optical fiber array units 5a and 5b, and irradiated with ultraviolet rays for curing. Here, since any adhesive flowing into the guide groove causes the guide pin to be fixed thereto, the adhesive is carefully made to flow only between the V-shaped grooved substrate of the optical fiber array unit 5a and the upper lid substrate of the optical fiber array unit 5b. For third lowest and upper optical fiber array units 5, as in the case of the optical fiber array units 5b, the optical fiber array unit 5 is disposed between the guide pins, the load G2 is exerted thereon from above, and the optical fiber array unit is fixed with the adhesive. The same process is conducted up to the eighth layer to provide a stack.

Assuming that an optical axis is the z-axis, an axis extending in the stacking direction is the y-axis, and an axis perpendicular to the z-axis and the y-axis and extending in the direction of arranging the optical fibers on one substrate is the x-axis, alignment of the optical fiber array units in the directions of the x- and y- axes is preferably conducted while observing beam centers through image recognition. An optical axis parallelism $\theta y$ for each layer is preferably adjusted by observing a distance in the direction of the z-axis through an auto-focus function or a scheme for searching a beam waist. Besides, an optical axis parallelism $\theta x$ is preferably adjusted so that the bottom surfaces of the substrates with V-shaped grooves of the optical fiber array units stacked one on another are parallel to each other and spaced apart from each other by a desired distance by observing the optical fiber array units from a side. Since the bottom surface of the substrate with V-shaped grooves and the line formed by the V-shaped grooves are parallel to each other, both the $\theta x$ and the $\theta z$ can be adjusted according to this method. With this method, although a device used becomes complicated, the two-dimensional optical fiber array formation (2DFA formation) can be conducted with reliability.

A second two-dimensional optical fiber array formation may be to position the optical fiber units by using a guide groove (positioning guide) 6 provided on the optical fiber array unit 5 and a positioning guide pin adapted to the guide, as shown in FIG. 3. In this case, a large-scale positioning device is not needed, and only a high-precision guide pin jig is needed. Since both the V-shaped grooves 21 for the optical fibers and the V-shaped guide grooves 6 can be provided on the same surface of the substrate 2 with V-shaped grooves, quite high precision of the V-shaped grooves 21 for the optical fibers and the V-shaped guide grooves 6 can be assured in terms of the positions, as well as the parallelism thereof. That is, according to this method, the positions in x and y directions and the optical axis parallelisms $\theta x$, $\theta y$, and $\theta z$ can be adjusted simultaneously, and quite high workability is provided. Here, the guide groove used for positioning may be used as a reference for polishing after stacking, or used for coupling the two-dimensional optical fiber array (2DFA) with another optical device. For example, when a user of another existing optical device is to couple a 2DFA with the existing optical device, he/she can use the guide groove of the 2DFA as a reference parallel to the optical axis. The guide groove can be omitted for downsizing, if it is not necessary.

Now, referring to FIG. 1, one embodiment of a method of measuring a core position of an optical element of a two-dimensional optical element array of this invention will be described. According to this embodiment, the method of measuring the core position of the optical fiber 1 of the above-described two-dimensional optical fiber array 10 comprises: a step of measuring core positions of m (four) rows of optical fibers 1 and measuring core positions of at least two of n (eight) columns of optical fibers 1, in the case where m (four in FIG. 1) optical fiber array units 5 are stacked and each optical fiber array unit has n (eight in FIG. 1) channels (in the case where the optical fibers 1 are arranged in m (four) rows and n (eight) columns); a step of arbitrarily designating one optical fiber 1 for each of the at least two columns of optical fibers 1 and measuring a distance D between the core positions of the designated optical fibers 1 (shown as designated optical fibers 1a in FIG. 1); and a step of calculating a positional relation among elements of a matrix of the core positions of the optical fibers 1 at four corners of a rectangular having the line segment connecting the core positions of the designated optical fibers 1a as a diagonal line thereof and calculating the core positions of all of the optical fibers 1.

Specifically, in FIG. 1, in which the optical fiber array units 5 are referred to as rows 1 to 4 from the bottom, and the columns of optical fibers are assigned reference characters A to H from left to right, the core positions of the rows 1 to 4 each having eight columns (eight channels) are measured, and the core positions of the columns A and H each having four rows (four channels) are measured. In addition, assuming that the optical fibers 1 associated with the matrix elements (1,A) and (4,H) are the designated optical fibers 1a, a diagonal distance D between the two points is measured. Based on the triangle (1,A) (4,H) (1,H) consisting of three sides of the diagonal line (1,A)–(4,H), the line (1,A)–(1,H) of the row 5a and the line (1,H)–(4,H) of the column H, a positional relation between the row 5a and the element (4,H) in the row 5d can be determined. Similarly, by measuring the length of the diagonal line (4,A)–(1,H) and the length of the line (1,A)–(4,A) of the column A, a positional relation between the row 5a and the element (4,A) in the row 5d can be determined based on the triangle (1,A) (4,A) (1,H). The positional relations between the row 5a and the row 5d and between the row 5a and the columns A and H thus determined can be combined with the positional data for the respective rows to provide a matrix of core positions. In this case, the core positions may be calculated by measuring the length of the diagonal line between the optical fibers designated based on the core positions of all columns and arbitrary two rows.

Furthermore, the columns to be measured are not limited to the columns A and H described above. However, since a larger distance between the columns would reduce influence of individual errors on the whole measurement, the columns at both ends are preferably measured. Besides, the designated optical fibers 1a are not limited to the matrix elements (1,A) and (4,H). However, since a large distance between the designated optical fibers 1a would reduce influence of individual errors on the whole measurement, the outermost optical fibers are preferably selected.

An apparatus used for implementation of the method of measuring a core position of an optical element of a two-dimensional optical element array of this invention is not limited particularly, as far as the coordinate of the core position of the optical element of the two-dimensional optical element array can be measured and calculated within the measurement system through an image processing, length measuring or the like, and there is no need to use any dedicated measurement apparatus.

Figure 12A:
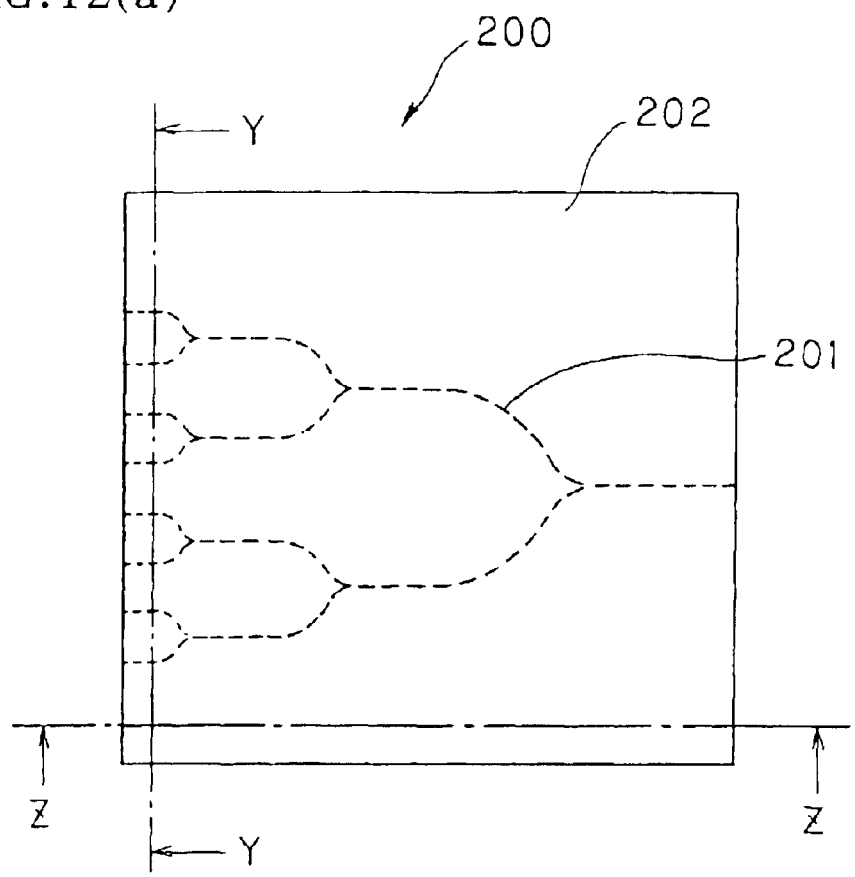
FIGS. 12(a) and 12(b) are a plan view and cross-sectional view, respectively, schematically showing one embodiment of a two-dimensional waveguide apparatus of this invention.
Figure 12B:
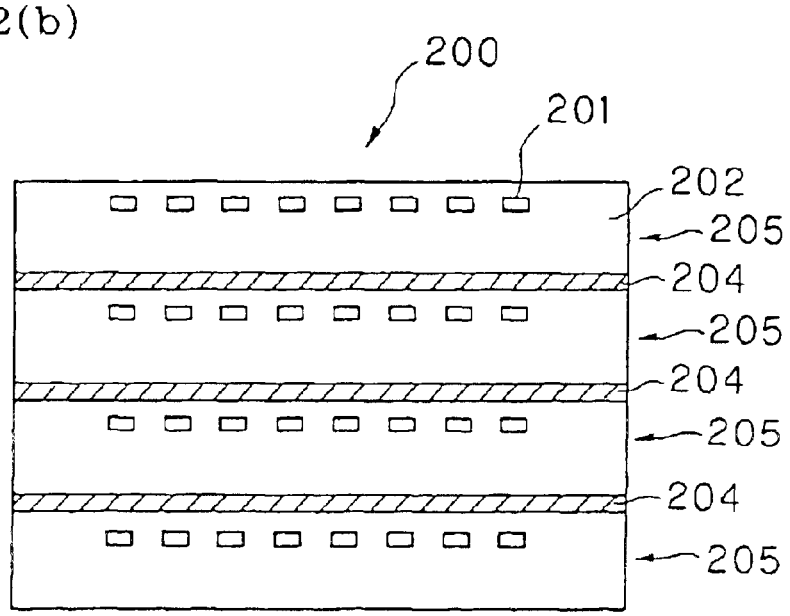

FIG. 12 schematically illustrates one embodiment of a two-dimensional waveguide apparatus of this invention, in which FIG. 12(a) is a plan view and FIG. 12(b) is a cross-sectional view taken along a line Y—Y in FIG. 12(a). As shown in FIG. 12, a two-dimensional waveguide apparatus 200 of this embodiment comprises a stack of a plurality of waveguide substrate units 205 each having one or more waveguides 201 patterned in a planar manner, in which the plurality of waveguide substrate units 205 are stacked in such a manner that surfaces of two adjacent waveguide substrate units 205 that face each other do not directly contact each other, and the adjacent two units do not have a direct mechanical influence on each other.

With such an arrangement, the density and capacity thereof can be enhanced and the number of steps in packaging or connection can be reduced.

In this case, an adhesive layer 204 is preferably provided between the surf aces of two adjacent waveguide substrate units 205 that face each other. As the adhesive layer 204, the same as in the above-described two-dimensional optical fiber array can be used.

The thickness of the adhesive layer 204 preferably falls within a range from 2 to 100 μm as in the case of the above-described two-dimensional optical fiber array.

Figure 13A:
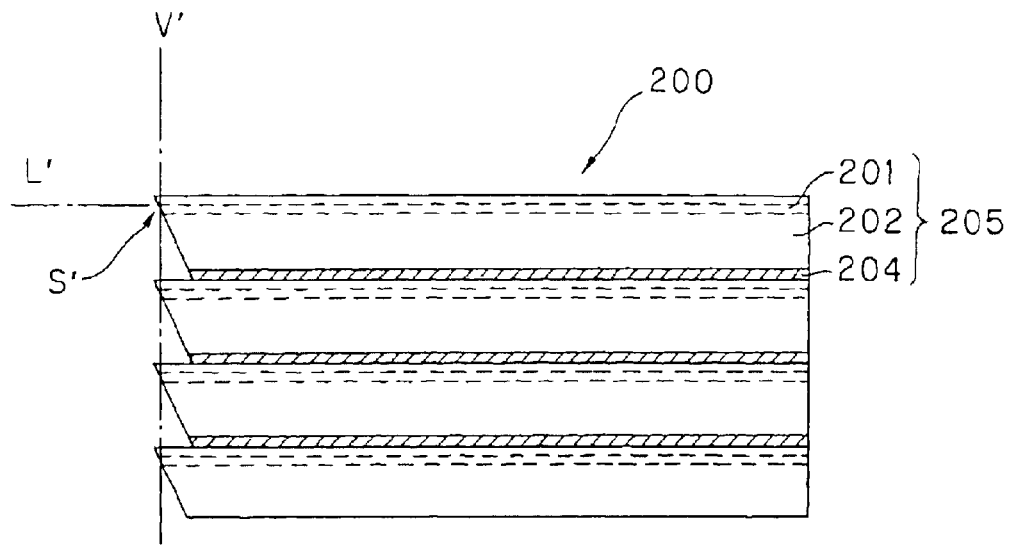
FIGS. 13(a) and 13(b) are cross-sectional views taken along a line Z—Z in FIG. 12(a) and showing two aspects of this invention.
Figure 13B:
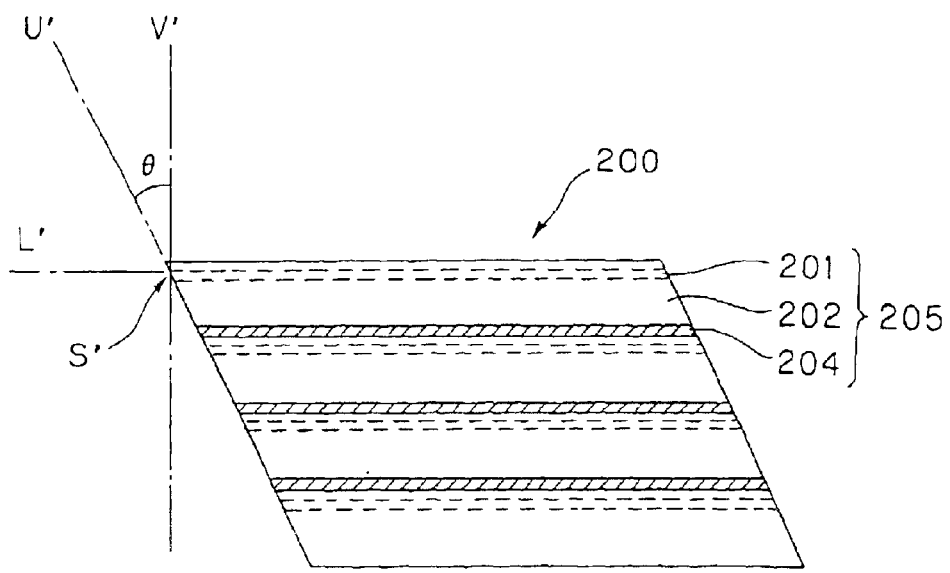

FIG. 13(a) is a cross-sectional view taken along a line Z—Z in FIG. 12(a) illustrating one aspect of this invention, and FIG. 13(b) is a cross-sectional view taken along the line Z—Z in FIG. 12(a) illustrating another aspect of this invention. As shown in FIG. 13, and as in the case of the two-dimensional optical fiber array described above, in the two-dimensional waveguide apparatus 200 of this embodiment, a light-emitting end face S' and/or light-receiving end face of the waveguide 201 of the waveguide substrate unit 205 is slanted by a predetermined angle (θ) with respect to a plane V' perpendicular to a central axis L' of the waveguide.

In this case, the light-emitting end faces S' and/or light-receiving end faces of the waveguides 201 of the waveguide substrate units 205 may be disposed in the plane V' perpendicular to the central axes L' of the waveguides, or may be disposed in a plane U' angled at a predetermined angle (θ) with respect to the plane V' perpendicular to the central axes L' of the waveguides. Alternatively, as in the case of the two-dimensional optical fiber array shown in FIG. 9, the light-emitting end faces S' and/or light-receiving end faces of the waveguides of the waveguide substrate units may be disposed in a plane perpendicular to the optical axis of the emitted light and/or incident light.

As one example of a method of manufacturing a two-dimensional waveguide apparatus of this invention, there is a method of manufacturing a two-dimensional waveguide apparatus by stacking a plurality of waveguide substrate units 205 each having one or more waveguides 201 patterned in a planar manner, in which the plurality of waveguide substrate units 205 are stacked in such a manner that surfaces of two adjacent waveguide substrate units 205 that face each other do not directly contact each other, and the adjacent two units do not have a direct mechanical influence on each other (see FIG. 12).

In this case, an adhesive layer 204 may be provided between the surfaces of two adjacent waveguide substrate units 205 that face each other.

The thickness of the adhesive layer 204 preferably falls within a range from 2 to 100 μm.

Each of the light-receiving or light-emitting end faces S' of the waveguides 201 of the waveguide substrate units 205 may be slanted by a predetermined angle (θ) with respect to the plane V' perpendicular to the central axes L' of the waveguides (see FIG. 13).

In this case, the light-emitting end faces S' and/or light-receiving end faces of the waveguides 201 of the waveguide substrate units 205 may be disposed in the plane V' perpendicular to the central axes L' of the waveguides, or the light-emitting end faces S' and/or light-receiving end faces of the waveguides 201 of the waveguide substrate units 205 may be disposed in a plane U' angled at a predetermined angle (θ) with respect to the plane V' perpendicular to the central axes L' of the waveguides. Alternatively, as in the case of the two-dimensional optical fiber array shown in FIG. 9, the light-emitting end faces and/or light-receiving end faces of the waveguides of the waveguide substrate units may be disposed in a plane perpendicular to the optical axis of the emitted light and/or incident light.

Figure 14:
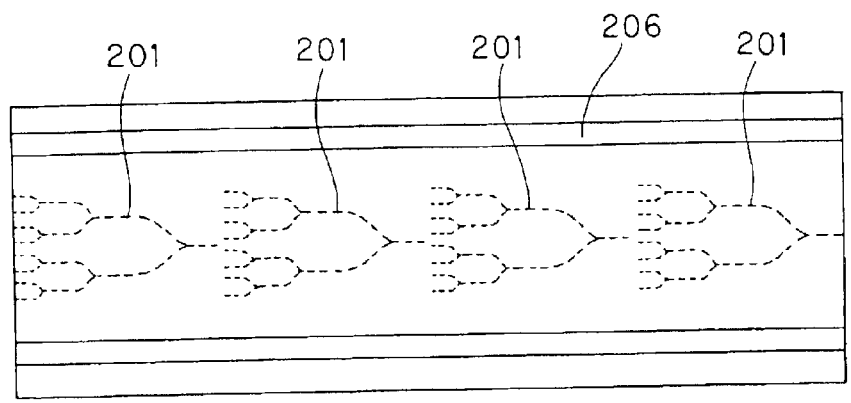
FIG. 14 is a schematic plan view for illustrating a method of stacking waveguide substrate units to provide a two-dimensional configuration in one embodiment of the two-dimensional waveguide apparatus of this invention.

As a method of stacking the waveguide substrate units 205 to form a two-dimensional waveguide apparatus, the same method as in the above-described two-dimensional optical fiber array can be used. In this case, for example, a positioning guide formed at a predetermined location on a surface of the waveguide substrate unit may be involved. FIG. 14 shows a case where four chips of waveguides 201 are formed on a single wafer with center lines thereof aligned, and positioning guides 206 are formed on both sides of the waveguides 201. These waveguides 201 can be formed by photolithography, for example. From the single wafer thus processed, the waveguide substrates to be stacked are cut and reserved. Thus, even if positions of the positioning guides 206 in transverse and depth directions with respect to the waveguides 201 are not absolutely precise, precision of stacking can be assured because the waveguide substrates to be stacked have the positioning guides aligned with each other.

Figure 15A:
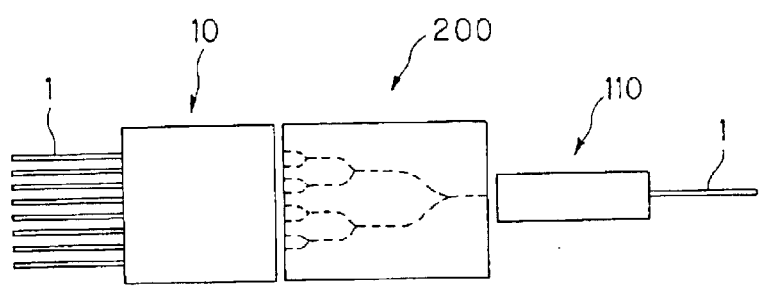
FIGS. 15(a) and 15(b) are a plan view and side view, respectively, schematically showing a state where the two-dimensional optical fiber array and a one-dimensional optical fiber array are connected to each other via the two-dimensional waveguide apparatus.
Figure 15B:
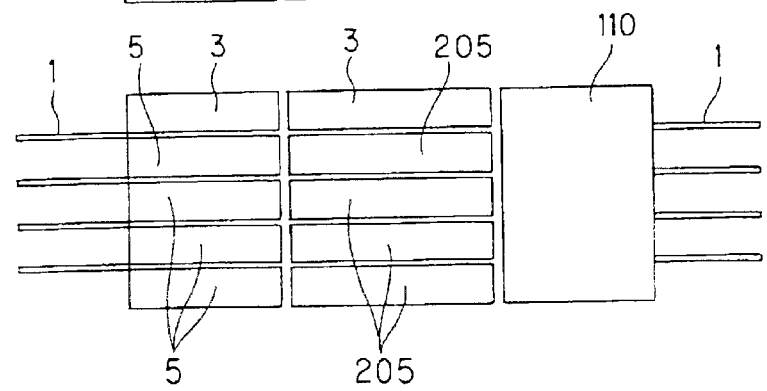
Figure 16:
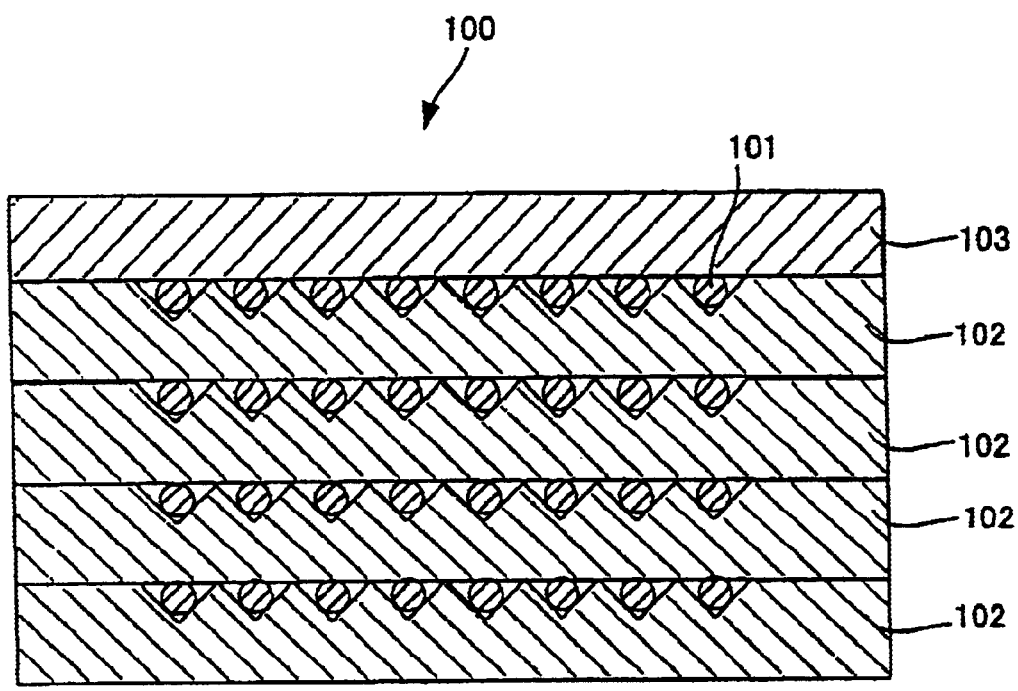
FIG. 16 is a schematic cross-sectional view of an exemplary conventional two-dimensional optical element array (optical fiber array).
Figure 17A:
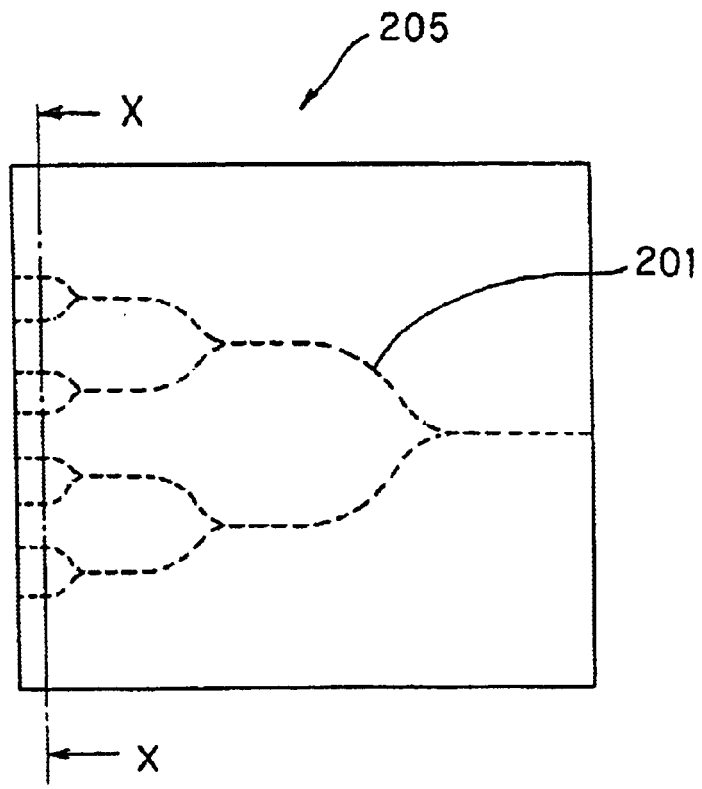
FIGS. 17(a) and (b) are a schematic cross-sectional view of an exemplary conventional waveguide apparatus.
Figure 17B:
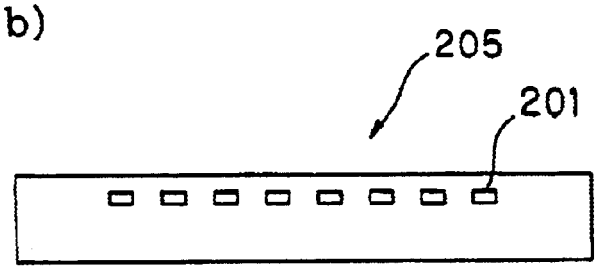

FIG. 15 schematically illustrates a state where a two-dimensional optical fiber array and a one-dimensional optical fiber are connected to each other via a two-dimensional waveguide apparatus, in which FIG. 15(a) is a plan view, and FIG. 15(b) is a side view. In FIGS. 15(a) and 15(b), a one-dimensional optical fiber array 110 with four channels, turned 90 degrees, is connected to a two-dimensional optical fiber array 10 with eight channels via the two-dimensional waveguide apparatus 200. The two-dimensional waveguide apparatus 200 comprises four waveguide substrate units 201 and a fixing member 3 stacked one on another, and the two-dimensional optical fiber array 10 comprises four optical fiber array units 5 and a fixing member 3 stacked one on another.

As described above, when connecting the waveguide substrates and the optical fiber arrays with each other, each of the optical fibers needs to be optically aligned with one of the waveguide substrates. In this alignment, the waveguide substrate and the optical fiber array are aligned with each other on the level of submicrons, and thus, there has been a problem in that the alignment inevitably requires extremely high precision and many process steps. However, with such an arrangement, one alignment process allows four substrates to be aligned, and thus, the number of steps in alignment and connection can be reduced substantially.

This invention will be described in more detail below with reference to an example. However, this invention should not be limited by the example in any sense.

EXAMPLE 1

A two-dimensional optical fiber array (2DFA) with 8- by 8-core having pitches of 1.5 mm in lateral and thickness directions was fabricated. An optical fiber array unit had a width of 13 mm and a thickness of 1.49 mm (total thickness of a substrate with V-shaped grooves and a fixing member) and an adhesive layer between optical fiber array units had a thickness of 10 $\mu$m. To attain high reliability, it is preferable that the adhesive layer has a thickness of about 10 to 20 $\mu$m. However, since the adhesive layer has a high thermal coefficient of thermal expansion, the value 10 $\mu$m was adopted to prevent the coefficient of thermal expansion of the whole device from being so high.

An epoxy resin adhesive, which has low curing ratio (2%) was used to fabricate the optical fiber array unit, and stack and fix the optical fiber array units. In the phase of stacking, the optical fiber array unit is held by a guide pin jig until the resin is cured in order to prevent the array from being displaced due to curing shrinkage. However, since a large curing shrinkage results in a large stress remaining in the form of a remaining distortion, the epoxy resin adhesive having low curing shrinkage was used.

As a method of stacking and fixing, the above-described two-dimensional optical fiber array formation was adopted, and the guide groove pitch was 15 mm. The optical fiber array units was not subject to end face polishing separately, but subject to polishing collectively after stacking. For the polishing, as shown in FIG. 3, the substrate with V-shaped grooves was made to outwardly protrude in the width direction from the fixing member, and a side of the substrate with V-shaped grooves was used as a reference plane for polishing. The side of the substrate with V-shaped grooves can be readily cut to be parallel to the V-shaped grooves in the phase of processing the substrate. Protruding the reference plane outwardly is preferred in the case where not only the polishing reference but also a relationship for the optical axis need to be known. For example, in the case where the above-described first two-dimensional optical fiber array formation is adopted, by protruding the reference plane outwardly, holding the sides of the substrates with V-shaped grooves can always assure a certain constant precision of the optical axis parallelism $\theta y$, and thus, the adjustment of $\theta y$ becomes easy.

In measurement of core positions of the two-dimensional optical fiber array after stacked, a device that can measure core positions only for one dimension at a time was used. Therefore, positions of cores in each layer were measured one layer after another, positions of first cores in the respective layers and positions of eighth cores in the respective layers were measured in the thickness direction, measurement was conducted for one diagonal line, and then the measurement results were combined to provide accurate core positions.

In the core position measurement, a satisfactory result was obtained: an error of an optical fiber having a maximum displacement from an ideal matrix coordinate (one of the 64 optical fibers of a channel having a maximum displacement) was not more than 2 $\mu$m. In this example, since the guide groove was not necessary, the sides were cut to reduce the width to 13 mm.

In addition, a thermo cycle test (−40 to 85° C.×70 cycles) and a high temperature and high humid test (85° C./85%×2 weeks) were performed on the resulting two-dimensional optical fiber array. As a result, a satisfactory result was obtained without peeling of the adhesive layer between the optical fiber array units and the like, or a failure such as cutting of a fiber.

EXAMPLE 2

The two-dimensional optical fiber array having a low return loss and 8- by 10- channels with a pitch of 1.5 mm and comprising a stack of optical fiber array units including optical fibers whose light-emitting end faces are polished to be slanted by a predetermined angle ($\theta=8°$) with respect to the plane perpendicular-to the optical axes thereof was fabricated. In this example, fabrication of the optical fiber array units, stacking of the optical fiber array units, and evaluation of the fabricated two-dimensional optical fiber array were conducted in this order.

Fabrication of Optical Fiber Array Unit

A substrate of borosilicate glass (coefficient of thermal expansion: $32\times10^{-7}$) was machined to provide a wafer of a size of 50 mm×55 mm×1.495 mm (thickness). The wafer was ground to form the V-shaped grooves for aligning and fixing the optical fibers and the positioning guides (V-shaped guide grooves) thereon. Eight V-shaped grooves were formed with a pitch of 1.5 mm, and the positioning guides (V-shaped guide grooves) were formed by being shifted 2 mm outward from the first and eighth V-shaped grooves.

Then, the wafer was cut into substrate chips of a predetermined size, each used for the optical fiber array unit. Since the two-dimensional optical fiber array to be provided has 8- by 10- channels, 10 substrate chips (optical fiber array units) were fabricated.

Then, the optical fiber array units were assembled. In this assembly, the optical fibers were first placed in the V-shaped grooves on the substrate, the optical fibers were pressed against the V-shaped grooves with a temporary fixing member (the temporary fixing member itself is not bonded, since it is made of an SUS material 1 mm thick and coated with fluororesin, such as polytetrafluoroethylene), and an adhesive for fixing (epoxy resin) was spread thereon and irradiated with ultraviolet rays for fixing. After the adhesive for fixing was cured, the temporary fixing member was peeled off the substrate to provide the optical fiber array unit.

Then, to prevent a coated part of an optical fiber from being made free to cause cutting of the optical fiber, an adhesive for fixing the coating (urethane acrylate resin) was applied to the rear end of the optical fiber array unit to fix the coated parts of the optical fibers.

Then, the end face of the optical fiber array unit was polished to be slanted. In order to make the end face of the optical fiber array unit be angled by $\theta=8°$, a dedicated jig was prepared. In this case, assuming that the optical axis extends in the direction of an angle 0°, the slant angle of the end face of the optical fiber array unit is 82°. Using the dedicated angled jig, the end face of the optical fiber array unit was coarse-lapped, fine-lapped, and then polished. This resulted in an error of ±0.3° for the angle of 82°.

Stacking of Optical Fiber Array Units

There are various methods of stacking the optical fiber array units, and a guide pin jig was used in this example. Here, the "guide pin jig" refers to a jig having guide pins mounted thereon with high precision for positioning the optical fiber array units in the stacking direction thereof. The guide pins and the jig substrate was made of zirconia. A beam, on which the guide pins are to be mounted, had V-shaped grooves with a pitch of 1.5 mm. The guide pins (diameter: 0.7 mm) were inserted into the V-shaped grooves and pressed against with a fixing member, thereby setting up the guide pins. In addition, two beams having the guide pins need to be positioned relative to each other with high precision. Thus, in order to position the two beams relative to each other with high precision, the relative position of the beams with the pins was precisely defined using a transverse beam and a diagonal beam.

The optical fiber array units were disposed between the guide pins mounted on the guide pin jig sequentially. Here, the guide pins and the positioning guides (V-shaped guide grooves) formed on the optical fiber array unit need to be in close contact with each other. Thus, a load was exerted on the optical fiber array unit to assure the contact with the guide pins. In this case, the load exerted on the optical fiber array unit was about 30 g. The optical fiber array units need to be aligned in the direction of the optical axes thereof with high precision. In this example, the optical fiber array unit was abutted against the substrate of the guide pin jig at the end faces thereof, thereby aligning the optical fiber array units. The alignment variation of the end faces of the optical fiber array units was about 10 $\mu$m. In this way, one optical fiber array units was fixed to the guide pin jig, and a next optical fiber array unit was fixed to the guide pin jig in the same manner.

Then, the optical fiber array units were fixed to each other by spreading an adhesive (ultraviolet curing epoxy resin) into a space therebetween. The adhesive layer formed between the optical fiber array units was about 10 $\mu$m thick. This process was repeated to fabricate the two-dimensional optical fiber array comprising ten layers.

Evaluation of Two-Dimensional Optical Fiber Array

First, evaluation of the precision of the two-dimensional optical fiber array fabricated in this example was conducted. The optical fiber array units were referred to as rows 1 to 10 from the bottom, and the columns of optical fibers were assigned reference characters A to H from left to right. The core positions of the rows 1 to 10 each having eight channels were measured, and the core positions of the columns A and H each having ten channels were measured. In addition, the optical fiber located at the matrix element (1,A) and the optical fiber located at the matrix element (10,H) were designated as the designated optical fibers, and a distance between the core positions thereof was measured. All the core positions of the two-dimensional optical fiber array were determined based on the relative position of the lowermost optical fiber array unit corresponding to the row 1 and the uppermost optical fiber array unit corresponding to the row 10 thus determined and the core positions for the columns A and H. A deviation of the core position matrix from an ideal core position matrix was calculated.

As a result, it was confirmed that, for all channels, core positions of the two-dimensional optical fiber array fabricated in this example lie within a range of ±2 $\mu$m from their respective positions in the ideal core position matrix.

Then, a return loss at the end face of the two-dimensional optical fiber array fabricated in this example was evaluated. The return loss was measured with an optical coherence domain reflectometry (OCDR). Here, the length of the optical fiber from a connector to the array end face of the two-dimensional optical fiber array was about 1.8 m.

As a result, the return loss at the end face of the two-dimensional optical fiber array fabricated in this example was confirmed to be 60 dB or more for all channels.

Then, reliability evaluation of the two-dimensional optical fiber array fabricated in this example was conducted. The two-dimensional optical fiber array was subjected to a thermo cycle test (−40 to 85° C.×70 cycles) and a high temperature and high humid test (85° C./85%×2 weeks).

As a result, it was confirmed that the two-dimensional optical fiber array fabricated in this example had the same core position precision and return loss before and after the tests. Good results were obtained. That is, the variation in core positions thereof was sufficiently low, specifically 0.3 $\mu$m or less, and the return loss was not changed.

EXAMPLE 3

The two-dimensional waveguide apparatus comprising a stack of four splitters each having 1- by 8- channels was connected to the two-dimensional optical fiber array. A waveguide core having waveguides with a pitch of 250 $\mu$m (on the side of 8 channels) was placed on a Si wafer having a thickness of 1 mm so as to be 1.03 mm high from the bottom of the Si wafer, and a clad having a thickness of 0.025 mm was formed thereon, thereby providing a splitter unit having a total thickness of 1.055 mm. As shown in FIG. 14, four chips of splitters were formed on one wafer, and positioning guides (grooves) were formed by grinding on the wafer with a pitch of 5 mm. In order to assure the stacking precision, the wafer was processed in the following manner so that the center positions, relative depth with respect to the waveguide and pitch of the stacking guide pins placed in the guide grooves are constant. The wafer was applied to a processing jig, as shown in FIG. 3 in Japanese Patent Laid-Open No. 5-273442, so as to be parallel to a reference surface for an object to be processed (both of a side surface and a bottom surface), and the positioning guides were formed so as to be parallel to a reference surface of a processing machine, thereby realizing the accurate relative position thereof. In this case, the required relationship between the reference surface for an object to be processed and the reference surface of the processing machine, such as parallel or orthogonal relationship, was assured. The wafer was cut into splitter chips, and the splitter chips were stacked and fixed with a core pitch of 1.06 mm in the stacking direction in a stacking manner shown in FIG. 13(*b*). That is, the adhesive layer between the splitter units was 5 $\mu$m. The end faces of the two-dimensional splitters were polished to have a shape angled by 8° as shown in FIG. 13(b). Then, the two-dimensional optical fiber array having 8- by 4- cores configured as shown in FIG. 1 was fabricated in the same manner as in Example 1. The end face was polished to be angled by 8° after stacking. The thickness of the optical fiber array unit (distance from the bottom of the V-shaped grooved substrate to the top of the fiber) was 1.055 mm, the same as the splitter unit, and the stacking pitch was 1.06 mm. In other words, the thickness of the adhesive layer between the optical fiber array units was 5 μm. In addition, a single-layer (one-dimensional) optical fiber array having four cores with a pitch of 1.06 mm was fabricated. The end face thereof was polished to be angled 8° so as to be parallel to the end face of the two-dimensional splitter when it is connected thereto (that is, in a direction of arrangement of optical fibers of the one-dimensional optical fiber array). These three were aligned with each other, connected to each other, and fixed to each other as in the case of a typical waveguide splitter module to provide a two-dimensional splitter module.

Although the two-dimensional splitter module fabricated in this example had a connection loss of 0.5 dB and a return loss of 60 dB, which are a little larger than those for a one-dimensional splitter module, the two-dimensional splitter module had characteristics suitable for practical use.

As described above, this invention can provide a two-dimensional optical element array with a high alignment precision of optical elements (optical fiber, lens, for example) on a substrate and a high long-term reliability, and a two-dimensional waveguide apparatus having high density and capacity and allowing the number of steps in packaging or connection to be reduced.

What is claimed is:

1. A two-dimensional optical element array, comprising: a stack of a plurality of optical element array units each having an optical element and a substrate, the substrate having one or more grooves each suited to a profile of said optical element on one of surfaces thereof, and one or more optical elements being aligned and fixed in the grooves, characterized in that said plurality of optical element array units are stacked in a state such that surfaces of the substrates among adjacent two units out of said plurality of optical element array units that face each other do not directly contact each other, and that said adjacent two units do not have a direct mechanical influence on each other.

2. The two-dimensional optical element array according to claim 1, wherein said optical element is an optical fiber or lens.

3. The two-dimensional optical element array according to claim 1, wherein an apex of an optical element arranged on the substrate of one of said optical element array units is brought into contact with a surface, facing thereto, of the substrate of another of said optical element array units, and surfaces of the substrates of adjacent two of said plurality of optical element array units that face each other are kept from direct contact with each other and that said adjacent two units do not have a direct mechanical influence on each other.

4. The two-dimensional optical element array according to claim 1, wherein said plurality of optical element array units are stacked in a state that an adhesive layer is interposed between an apex of an optical element arranged on the substrate of one of said optical element array units and a surface, facing thereto, of the substrate of another of said optical element array units, said apex of the optical element and said surface of the substrate are brought into contact with said adhesive layer, and the surfaces of the substrates of adjacent two of said optical element array units that face each other do not directly contact each other, and that said adjacent two units do not have a direct mechanical influence on each other.

5. The two-dimensional optical element array according to claim 1, wherein said groove is a V-shaped groove.

6. A two-dimensional optical element array, comprising:

a stack of a plurality of optical element array units each having an optical element and a substrate, the substrate having one or more grooves each suited to a profile of said optical element on one of surfaces thereof, and one or more optical elements being aligned and fixed in the grooves;

a fixing member on one of surfaces of said substrate of the uppermost optical element array unit and between said substrates of adjacent optical element array units, the fixing member pressing or mounting said optical element against or on one surface with said grooves of said substrate for alignment and fixing, characterized in that said plurality of optical element array units are stacked in a state such that surfaces of the substrates among adjacent two units out of said plurality of optical element array units that face each other do not directly contact each other, and that said adjacent two units do not have a direct mechanical influence on each other.

7. The two-dimensional optical element array according to claim 6, wherein said optical element is pressed against or mounted on said substrate for alignment and fixing in such a manner that said optical element abuts on a surface of said fixing member and on a side wall of said groove.

8. The two-dimensional optical element array according to claim 6, further comprising an adhesive layer between the surface of said fixing member and the surface of said substrate of said optical element array unit which faces to the surface of the fixing member.

9. The two-dimensional optical element array according to claim 8, wherein a thickness of said adhesive layer falls within a range from 2 to 100 μm.

10. The two-dimensional optical element array according to claim 1, wherein a positioning guide is formed at a predetermined position in the surface with said grooves of said substrate of said optical element array unit.

11. The two-dimensional optical element array according to claim 6, wherein said fixing member presses or mounts said optical element against or onto the surface with said grooves of said substrate for alignment and fixing in such a manner that a surface of said fixing member and a surface of said substrate of said optical element array unit which faces to the surface of the fixing member do not directly contact each other, and that said adjacent two units do not have a direct mechanical influence on each other.

12. A two-dimensional optical element array, comprising: a stack of a plurality of optical element array units each having an optical element and a substrate, the substrate having one or more grooves each suited to a profile of said optical element on one of surfaces thereof, and one or more optical elements being aligned and fixed in the grooves, wherein a light-emitting end face and/or light receiving end face of said optical element of said optical element array unit is provided by slanting it or them a predetermined angle (θ) with respect to a plane perpendicular to a central axis of the optical element, characterized in that said plurality of optical element array units are stacked in a state such that surfaces of the substrates among adjacent two units out of said plurality of optical element array units that face each other do not directly contact each other, and that said adjacent two units do not have a direct mechanical influence on each other.

13. The two-dimensional optical element array according to claim 12, wherein the light-emitting end face and/or light receiving end face of said optical element is disposed in said plane perpendicular to the central axis of the optical element.

14. The two-dimensional optical element array according to claim 12, wherein the light-emitting end face and/or light receiving end face of said optical element is disposed in a plane angled by a predetermined angle ($\theta$) with respect to said plane perpendicular to the central axis of the optical element.

15. The two-dimensional optical element array according to claim 12, wherein the light-emitting end face and/or light receiving end face of said optical element is disposed in a plane perpendicular to an optical axis of an emitted light and/or incident light, respectively.

16. A two-dimensional waveguide apparatus, comprising a stack of a plurality of waveguide substrate units each having one or more waveguides patterned in a planar manner, characterized in that said plurality of waveguide substrate units are stacked in a state such that surfaces of the substrates among adjacent two units out of said plurality of waveguide substrate units that face each other do not directly contact each other, and that said adjacent two units do not have a direct mechanical influence on each other.

17. The two-dimensional waveguide apparatus according to claim 16, wherein a positioning guide is formed at a predetermined location on a surface of said waveguide substrate unit.

18. The two-dimensional waveguide apparatus according to claim 16 further comprising an adhesive layer between the surfaces facing each other of two adjacent waveguide substrate units of said plurality of waveguide substrate units.

19. The two-dimensional waveguide apparatus according to claim 16, wherein a thickness of said adhesive layer falls within a range from 2 to 100 $\mu$m.

20. A two-dimensional waveguide apparatus, comprising a stack of a plurality of waveguide substrate units each having one or more waveguides patterned in a planar manner, wherein a light-emitting end face of each waveguide of said waveguide substrate unit is slanted by a predetermined angle ($\theta$) with respect to a plane perpendicular to an optical axis thereof, characterized in that said plurality of waveguide substrate units are stacked in a state such that surfaces of the substrates among adjacent two units out of said plurality of waveguide substrate units that face each other do not directly contact each other, and that said adjacent two units do not have a direct mechanical influence on each other.

21. The two-dimensional waveguide apparatus according to claim 20, wherein the light-emitting end face and/or light receiving end face of said waveguide of said waveguide substrate unit is disposed in a plane perpendicular to an optical axis of an emitted light and/or incident light, respectively.

22. The two-dimensional waveguide apparatus according to claim 20, wherein the light-emitting end face and/or light receiving end face of said waveguide of said waveguide substrate unit is disposed in a plane perpendicular to a central axis of said waveguide.

23. The two-dimensional waveguide apparatus according to claim 20, wherein the light-emitting end face and/or light receiving end face of said waveguide of said waveguide substrate unit is disposed in a plane angled by a predetermined angle ($\theta$) with respect to said plane perpendicular to the central axis of said waveguide.

24. A method of measuring a core position of an optical element of a two-dimensional optical element array which comprises a stack of a plurality of optical element array units each having an optical element and a substrate, the substrate having one or more grooves each suited to a profile of said optical element on one of surfaces thereof, and one or more optical elements being aligned and fixed in the grooves, wherein said plurality of substrate units are stacked in a state such that surfaces of the substrates among adjacent two units out of said plurality of optical element array units that face each other do not directly contact each other, and that said adjacent two units do not have a direct mechanical influence on each other, characterized in that said method comprises the steps of:

measuring core positions of m rows of optical elements and measuring core positions of at least two of n columns of optical elements in the case where m optical element array units are stacked and each optical element array unit has n channels;

designating arbitrarily one optical element for each of said at least two columns of optical elements and measuring a distance D between the core positions of said optical elements designated; and calculating a positional relation among elements of a matrix of the core positions of said optical elements at four corners of a rectangular having a line segment connecting the core positions of said designated optical elements as a diagonal line thereof and calculating the core positions of all of said optical elements.

* * * * *